United States Patent
Hanawa et al.

(10) Patent No.: US 8,281,243 B2
(45) Date of Patent: Oct. 2, 2012

(54) DISPLAY OF WORK CONTENT

(75) Inventors: Hirofumi Hanawa, Tokyo (JP); Yoshinao Kobayashi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 580 days.

(21) Appl. No.: 12/448,257

(22) PCT Filed: Dec. 21, 2007

(86) PCT No.: PCT/JP2007/075338
§ 371 (c)(1),
(2), (4) Date: Jun. 15, 2009

(87) PCT Pub. No.: WO2008/078829
PCT Pub. Date: Jul. 3, 2008

(65) Prior Publication Data
US 2010/0107077 A1    Apr. 29, 2010

(30) Foreign Application Priority Data
Dec. 26, 2006 (JP) .................................. 2006-349650

(51) Int. Cl.
*G06F 3/00* (2006.01)

(52) U.S. Cl. ........ 715/716; 715/712; 715/713; 715/719; 715/720; 715/721; 715/722; 715/776

(58) Field of Classification Search .................. 715/712, 715/713, 719, 720, 721, 722, 776
See application file for complete search history.

(56) References Cited

U.S. PATENT DOCUMENTS

| | | | |
|---|---|---|---|
| 6,345,207 B1* | 2/2002 | Nitta et al. | 700/83 |
| 2004/0017404 A1* | 1/2004 | Schileru-Key | 345/854 |
| 2005/0233290 A1* | 10/2005 | Jackson | 434/262 |
| 2006/0172275 A1* | 8/2006 | Cohen | 434/350 |
| 2006/0200106 A1 | 9/2006 | Okubo | |
| 2007/0266304 A1* | 11/2007 | Fletcher et al. | 715/500.1 |

FOREIGN PATENT DOCUMENTS

| | | |
|---|---|---|
| JP | 06-168254 | 6/1994 |
| JP | 2004-227193 A | 8/2004 |
| JP | 2005-040223 | 2/2005 |
| JP | 2006-246173 | 9/2006 |
| JP | 2006-259926 A | 9/2006 |

OTHER PUBLICATIONS

Japanese Office Action application No. 2006-349650 dated Aug. 30, 2011.

* cited by examiner

*Primary Examiner* — Nicholas Augustine
*Assistant Examiner* — Claudia Dragoescu
(74) *Attorney, Agent, or Firm* — Squire Sanders (US) LLP

(57) ABSTRACT

The present invention provides a worker with information about work to be paid attention when the work is displayed in the moving image data. Work content for each of steps of the work to be carried out on a product is stored as moving image data in a storage unit. In response to a desired step being selected on a display device, the moving image data corresponding to the selected step is read from the storage unit. Playback of the moving image data is started on the display device. When starting the playback of the moving image data, a time bar where a progress of the playback of the moving image data is indicated by a slider. Attention work is predetermined within the step of the work. An occurrence timing of the attention work is displayed corresponding to the time bar.

10 Claims, 20 Drawing Sheets

| Part | Step | Part detail screen | Moving image data | Number of frames | Frame number | Index | Attention work | Power scale | Power line |
|---|---|---|---|---|---|---|---|---|---|
| A | A1 | | | | | | | | |
| | ... | ... | ... | ... | ... | ... | ... | ... | ... |
| | A2 | | | | | | | | |
| | ... | ... | ... | ... | ... | ... | ... | ... | ... |
| | A3 | O3 | MA3 | N | 0~n1 | IA31 | | | |
| | | | | | (n1+1~n2) | IA32 | | | |
| | | | | | (n2+1~n3) | IA33 | n2+1 | P33 | PL33 |
| | | | | | (n3+1~N−1) | IA34 | | | |
| | ... | ... | ... | ... | ... | ... | ... | ... | ... |

DISPLAY OF WORK CONTENT

TECHNICAL FIELD

The present invention relates to displaying content of work to be carried out on a product such as service work.

BACKGROUND ART

Conventionally, when a worker intends to carry out work such as service work or the like on a product, explanatory materials such as a service manual is used. In the explanatory materials, the work content is represented by illustrations. A worker proceeds with the work while referring to the illustrations.

Recently, as a structure of a product such as a car is becoming complicated, the work content to be carried out on the product is becoming complicated. Accordingly, a large amount of time and workload is needed for a worker to understand the work content.

As a result, if a worker handles the product without sufficiently checking or understanding the work content, the probability that the work carried out by the worker leads to an inappropriate result is higher. Especially, immediately after a product has been put on the market, the time is short for a worker to understand the work content and hence a situation may happen where the worker has to perform unfamiliar work. Such inappropriate work may cause an unexpected result such as damage to the product and eventually the work may not be normally completed.

For example, Japanese Patent Application Publication No. H06-168254 discloses a technique for displaying on a terminal unit a disassembling procedure for a product as a three-dimensional moving image. A worker proceeds with the work while intuitively recognizing the work content by referring to the moving image.

The above technique makes a work procedure more visible to a worker by displaying the three-dimensional moving image. However, such three-dimensional moving image is only an upgrade of a conventional work procedure provided on a paper medium. For the work that requires a "knack", such as work carried out on a spot to be paid attention to and error-prone work, the above technique provides a worker with no information, and the worker has to gain some experience to master the work. According to the above technique, a worker is provided with no information about what work should be particularly carefully carried out or how the worker should pay attention. Therefore, even if the worker understands the work content displayed in the three dimensional moving image, the result may be inappropriate work.

The present invention aims at solving these problems. One object of the present invention is to provide a technique that is capable of attracting the attention of a worker for work carried out on a spot to be paid attention to and error-prone work. Further, another object of the present invention is to provide a technique that is capable of providing a worker with information regarding a "knack" or "know-how" of work carried out on a spot to be paid attention and or error-prone work.

DISCLOSURE OF INVENTION

According to the present invention, work content for each of steps of work to be carried out on a product is stored as moving image data in a storage unit. In response to a desired step from the steps of the work being selected on a display device, the moving image data corresponding to the selected step of the work is read from the storage unit. Playback of the moving image data is started on the display device. When starting playing back the moving image data, a time bar where a progress of the playback of the moving image data is indicated by a slider is displayed. For attention work that is predetermined within the step of the work, an occurrence timing of the attention work is displayed corresponding to the time bar.

Thus, a worker can easily understand the work content because the worker can visually check the work content through moving image for each step. Because an occurrence timing of work to be paid attention is displayed on the time bar, the worker's attention is attracted to the work and the worker's understanding of the work is deeper.

According to one embodiment of the present invention, when the playback of the moving image data reaches the occurrence timing of the attention work, images of the moving image data are played back together with a mark that indicates the attention work. Thus, a worker can recognize that work being displayed by the moving image data requires more attention. As a result, the worker can deeply understand the work.

According to one embodiment of the present invention, images of the moving image data that are being played back are switched in accordance with a user operation for moving the slider in the direction where the progress of the playback is moved forward or the direction where the progress of the playback is moved backward.

Thus, displaying desired work can be easily repeated through an operation on the slider of the time bar. Further, attention work can be checked repeatedly by using as a guide a position of the attention work occurrence timing on the time bar.

According to one embodiment of the present invention, each step of the work is divided into a plurality of sub-steps. A predetermined image of the moving image data corresponding to each sub-step is displayed as an index that indicates the sub-step. In response to the index being selected, the slider is moved to a start time of the sub-step corresponding to the selected index.

Thus, a worker can easily skip to desired work in the moving image data by referring to the index displayed as an image. Thus, the worker can skip unnecessary work and easily and rapidly moves to desired work.

According to one embodiment of the present invention, when one or more predetermined images of the moving image data are played back on the display device, a work power scale that indicates a degree of a power that is required for the work rendered in the predetermined images is displayed.

Thus, because a worker can visually check a degree of a power required for the work, the worker can deeply understand the work and the work efficiency can be improved.

According to one embodiment of the present invention, the moving image data includes, for the attention work, images of a correct work content paired with images of an incorrect work content. The images of the correct work content are played back after the images of the incorrect work content are played back.

Thus, because an example of the correct work is displayed after an example of the incorrect work is displayed, the worker's understanding of the correct work can be promoted while attracting the worker's attention so as to prevent the incorrect work.

According to one embodiment of the present invention, the product is displayed such that parts of the product on which the steps of the work are to be carried out are colored. In response to one of the colored parts being selected, the moving image data for the step of the selected part is read from the storage unit. Playback of the moving image data is started on the display device.

Thus, a part on which work is to be carried out can be easily and visually identified and playback of the moving image data for the selected part can be easily started.

BEST MODE FOR CARRYING OUT THE INVENTION

Figure 1:
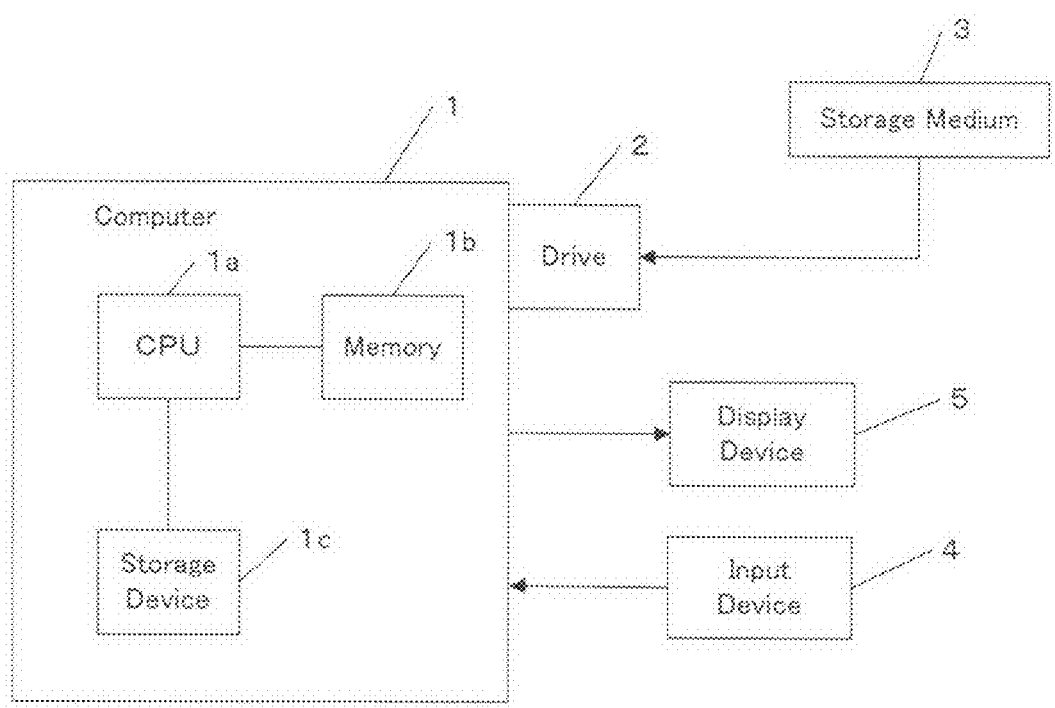
FIG. 1 is a block diagram of a work content visual display system in accordance with one embodiment of the present invention.

Preferred embodiments of the present invention will be described referring to the accompanying drawings. FIG. 1 is a block diagram showing an overall structure of a work content visual display system in accordance with one embodiment of the present invention.

A computer 1 comprises a central processing unit (CPU) 1a, a memory 1b that is implemented with a random access memory and so on, and a storage device 1c implemented with a hard disk and so on. The computer 1 also comprises a drive mechanism 2 for loading a computer-readable storage medium 3 such as a CD-ROM or the like. By setting the storage medium 3 in the drive mechanism 2, the computer 1 can read out one or more programs and data that are stored in the storage medium 3. The drive mechanism 2 may be connected to the computer 1 as an external device by using a USB (universal serial bus) or the like.

In this embodiment, the storage medium 3 is a CD-ROM in which one or more programs and data used when the CPU 1a executes the programs in accordance with the present invention are stored, which will be described in detail later. Alternatively, one or more programs and data may be stored in the storage device 1c of the computer 1 instead of the storage medium 3. The present invention is applicable to such configuration.

The computer 1 further comprises an input device 4 such as a keyboard, a mouse and so on for inputting data, and a display device 5 for displaying data such as an operation screen and so on. A touch panel may be used as the input device 4. For example, the display device 5 may be configured to act as a touch panel for detecting a position on the screen touched by a finger or a special-purpose pen.

The CPU 1a uses the memory 1b to perform operations in accordance with one or more programs stored in the storage medium 3 and/or the storage device 1c based on data stored in the storage medium 3 and/or the storage device 1c and data received through the input device 4. The CPU 1a can display results of the operations on the display device 5 and/or store them in the storage device 1c.

It should be noted that the present invention is not limited to the system configuration as described above. For example, the present invention may be applied to a configuration of a server/client system. For example, one or more programs and data in accordance with the present invention can be stored in a storage device of a server. The server performs operations in accordance with the programs, for example, in response to an input operation on an input device of a client computer. A result of the operations is sent to the client computer and displayed on its display device.

In the following embodiments, the present invention will be described by using service work for a car as an example. However, it should be noted that the present invention can be similarly applied to any product or any work.

Figure 2:
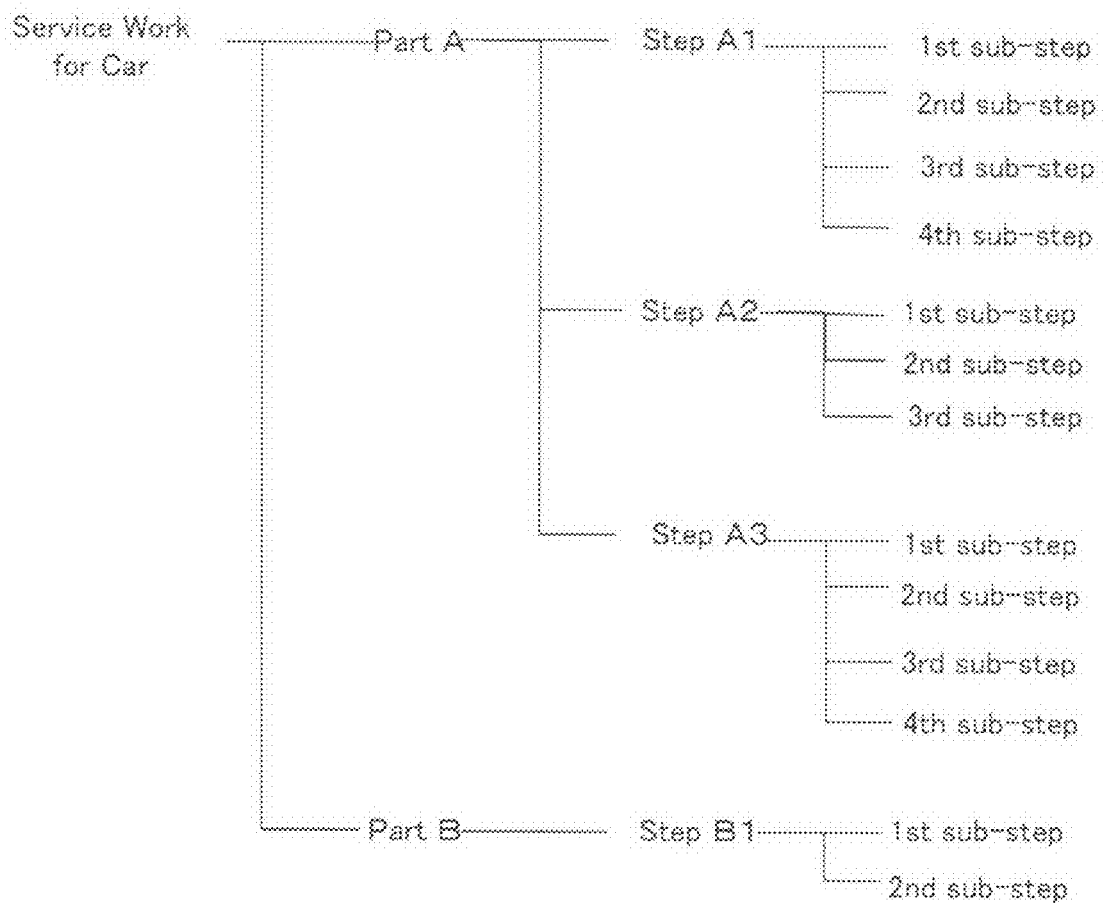
FIG. 2 shows an exemplary scheme of work for parts of a product in accordance with one embodiment of the present invention.

Now, for a purpose of obtaining understanding of the present invention, "work" used in the following embodiments will be described referring to FIG. 2.

Service work for a car includes a plurality of work steps. There is at least one work step for a part of the car. Each step is further divided into a plurality of sub-steps.

In this example, there are work steps A1 to A3 for a part A. For example, in the case where the part A is a front bumper, there is additional work (additional operation) in addition to main work (main operation) that removes the front bumper. The main work corresponds to the step A3. The work for removing a front grille cover corresponds to the step A1. The work for removing a front bumper side trim corresponds to the step A2. The part A is an example having the additional work. Of course, a part in which there is no additional work can exist.

In this example, the step A3 corresponding to the main work is further divided into first through fourth sub-steps. It can be determined, in accordance with any appropriate criteria, how many sub-steps are generated from a step or where the division is made during the step.

In this embodiment, the work step is provided for each part. It should be noted that this is only one example. It can be arbitrarily determined depending on the types of the product, the work content and so on what work content is to be included in one step.

Figures 3, 4:
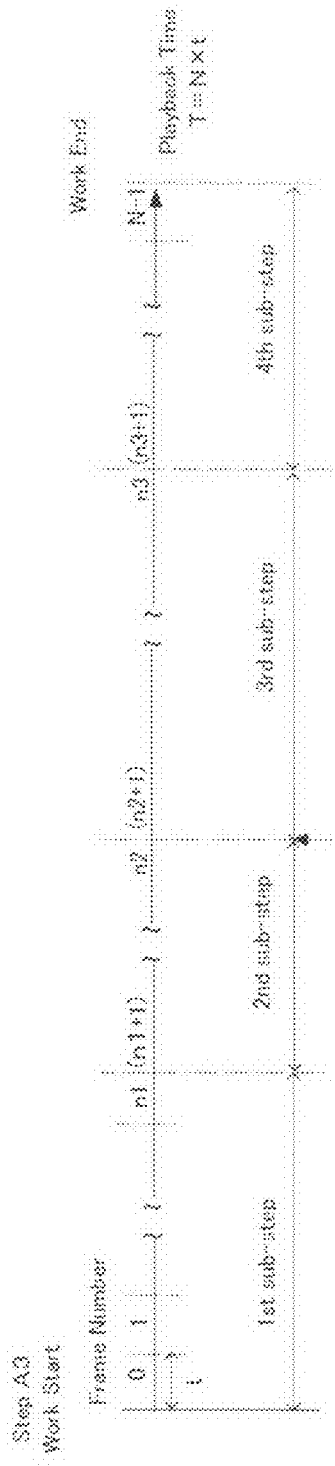
FIG. 3 schematically shows a time line of work in accordance with one embodiment of the present invention.
FIG. 4 schematically shows an example of a work information table in accordance with one embodiment of the present invention.

In the present invention, the work content for each step is displayed as moving images on the display device 5. Referring to FIG. 3, a time line for playing back the moving image data for the step A3 is shown as an example. The moving image data is formed by a series of frames. Each frame is a static image. The moving image data is displayed by playing back a series of frames at a predetermined speed. In this example, the number of frames included in the moving image data for the step A3 is N. The time interval at which each frame is played back is t. Therefore, the total playback time for the step A3 is shown by T=N×t. The step A3 is divided into the first through fourth sub-steps. A predetermined number of frames are associated with each sub-step. For example, frame numbers 0 to n1 correspond to the first sub-step and frame numbers (n1+1) to n2 correspond to the second sub-step.

As described above, the work may include error-prone work and work that requires more attention. In the present invention, information regarding such work to be carried out with more attention is provided to a worker. In the following description, such work will be referred to as "attention work".

A position on the time line at which the attention work occurs will be referred to as an "attention work occurrence timing". A plurality of attention work occurrence timings can be set in one step. In this example, work that starts from the first frame of the third sub-step is predetermined as the attention work and a starting time point of the first frame is the attention work occurrence timing. Thus, in this example, the third sub-step is established such that the occurrence timing corresponds to the starting point of the third step. Alternatively, the attention work occurrence timing may be set at some midpoint of the sub-step.

The attention work occurrence timing can be identified by the frame number. In this example, the occurrence timing is identified by the frame number (n2+1). Alternatively, the attention work occurrence timing may be identified by the elapsed time from the start of the playback because a series of frames are sequentially played back at the time interval t. In this example, the occurrence timing can be identified by the elapsed time (n2+1)×t.

FIG. 4 shows one example of a work information table that is stored in the storage medium 3. For each part, a step field, a part detail screen field, a moving image data field, a number of frames field, a frame number field, an index field, an attention work field, a power scale field and a power line field are provided. Data included in these fields is based on the example of FIG. 2 and FIG. 3.

The step field includes data for identifying one or more steps associated with a corresponding part. In this example, as shown in FIG. 2, the steps A1, A2 and A3 are provided for the part A. The part detail screen field stores a storage location (file name) of image data for the part detail screen (which will be described later) of a corresponding step.

The moving image data field includes a storage location (file name) of moving image data for a corresponding step. The number of frames field stores the number of frames constituting the moving image data.

The frame number field stores, for each of the sub-steps included in the corresponding frame, a range of frame numbers of moving image data corresponding to the sub-step. For example, as shown in FIG. 3, the first sub-step corresponds to the frame numbers 0 to n1. In this embodiment, one moving image data file is prepared for each step. Alternatively, a moving image data file may be prepared for each sub-step.

The index field includes, for each sub-step, a storage location (file name) of static image data associated with the sub-step. The static image data is created based on a predetermined frame included in the moving image data of the sub-step. The static image data is displayed as an index for selecting the sub-step. In this embodiment, an image of the frame at the starting point of the sub-step (for example, the frame n2+1 for the third sub-step of the step A3) is used as an index.

The attention work field stores data for identifying the above-described attention work occurrence timing. In this example, the frame number in which the attention work occurrence timing is positioned is stored. In the example of FIG. 3, because the attention work occurrence timing is set at the first frame of the third sub-step, the number (n2+1) is stored. Alternatively, as described above, the attention work occurrence timing may be identified by using another parameter.

The power scale field stores data for indicating a range of frames in which a work power scale (which is to be described later) is to be displayed. In this embodiment, the range is specified by the frame number. The power line field stores data for identifying a length of a power line to be displayed on the work power scale of each of the frames stored in the power scale field. The power line relatively represents a degree of a power required for operation rendered in the corresponding frame. For convenience sake, data stored in these fields are shown as "P33" and "PL33", respectively, in FIG. 3.

Information included in the work information table is not limited to that shown in FIG. 3. Such information may be stored in another record format. Further, instead of defining the work information table, part or all of the information as shown in FIG. 3 may be pre-defined in one or more programs.

In this embodiment, moving images are implemented by three-dimensional computer graphics images. A series of frames constructing the moving image data may be compressed according to an appropriate compression technique (such as MPEG-4 format) and stored in the storage medium 3 in order of playback.

The moving image data can be created in any appropriate format by any appropriate technique. For example, through use of appropriate animation creating software, each frame can be created by specifying the three-dimensional information (for example, position, orientation, color, texture, viewpoint and so on of each part) during the work for disassembling a product into parts. Such specification may be achieved by using a three-dimensional model generated by, for example, a CAD system. Alternatively, real images or a composition of real images and computer graphics images may be used as moving images.

In addition, circumstantial sound that occurs when the work is actually carried out may be prepared as sound data, which can be included in the moving image data. The sound data is played back in synchronization with the frames. The synchronization can be achieved by any technique.

Figure 5:
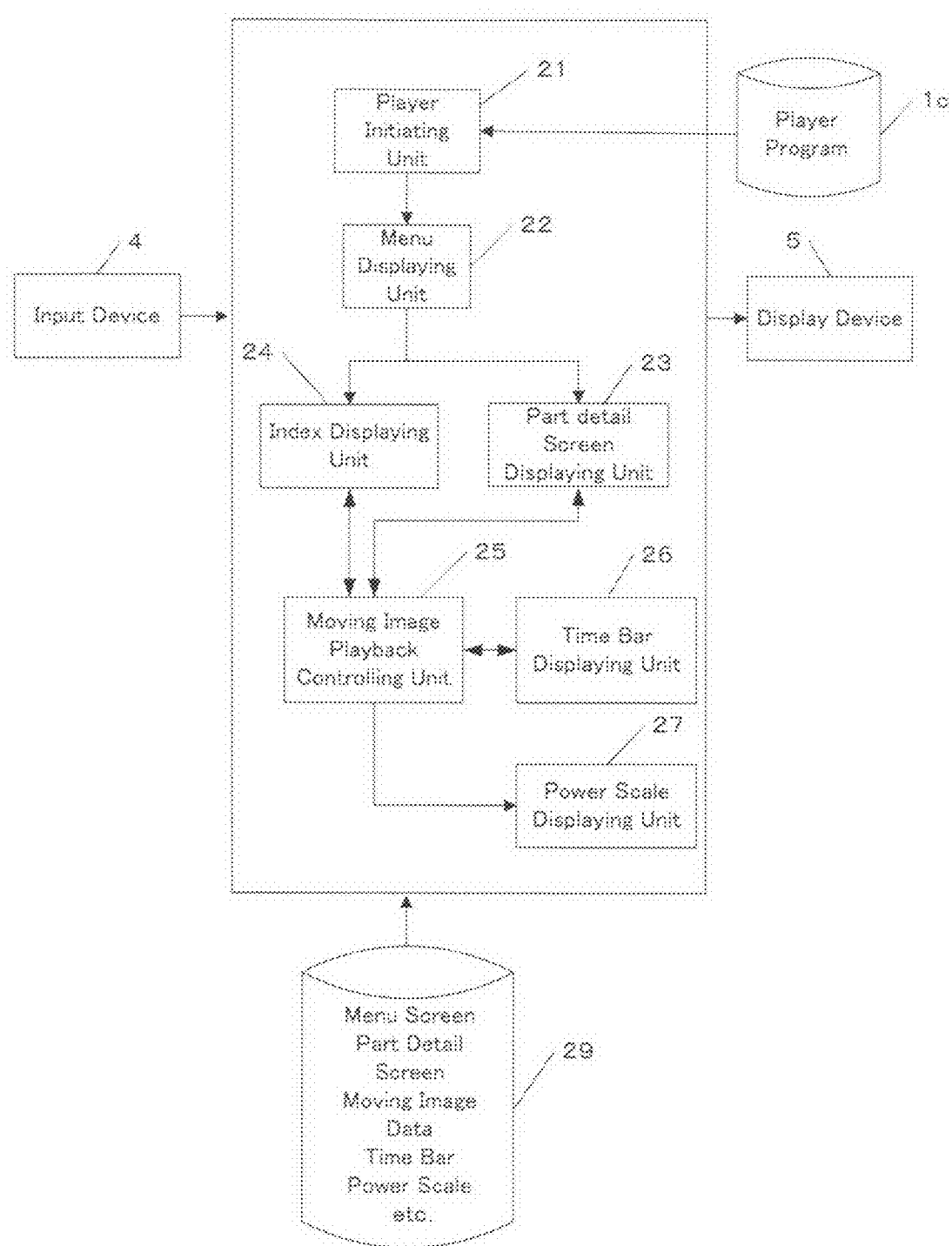
FIG. 5 shows a functional block diagram of a program for displaying moving image of work content in accordance with one embodiment of the present invention.

FIG. 5 is a functional block diagram of one or more programs stored in the storage medium 3. In the figure, data stored in advance in the storage medium 3 is represented by a storage unit 29.

When the storage medium 3 is loaded into the drive 2, one or more programs stored in the storage medium 3 are automatically loaded into the memory 1b of the computer 1 and then are executed by the CPU 1a. Alternatively, instead of the automatic execution, the programs may be executed in response to an operation on the input device 4. When the programs are executed, various functions of blocks 21 to 27 are implemented by the CPU 1a of the computer 1 as described below.

In the following description, functions are often discussed in such a manner that each function is implemented by a corresponding functional block. It should be noted that such discussion more specifically means that each function is implemented by the CPU 1a. For example, consider a function for displaying a predetermined screen on the display device 5 in accordance with an operation on the input device 4. This indicates that the CPU 1a of the computer 1 implements this function in response to the input operation. A subject that implements the functions of the functional blocks shown in the figure may be referred to as a control unit.

Further, in the following description, a selection operation on a predetermined area, index, button or the like in a screen displayed on the display device 5 is performed through the input device 4. Such selection operation may be implemented via, for example, mouse click. It should be noted that the operation is not limited to the mouse click. Such selection operation can be implemented through any appropriate input device such as a keyboard, a special-purpose pen or the like.

At first, a player initiating unit 21 initiates a player that is capable of playing back the moving image data stored in the storage unit 29. It is determined, depending on the format of the moving image data, what player is to be used. The software (program) for implementing the player is pre-stored in the storage device is of the computer 1. Alternatively, the software for implementing the player may be pre-stored in the storage medium 3. The software is loaded into the memory 1b or the storage device 1c of the computer 1 and then initiated.

In this embodiment, screens (including not only moving images, but also static images such as a menu screen) to be displayed on the display device 5 are created in the SWF format. The player initiating unit 21 initiates the Adobe® Flash® Player. In the following description, these screens are displayed on the display device 5 via this player. Of course, the present invention is not limited to such format and player. The screens may be developed in another format and displayed via another player suitable for the format, to which the present invention is applicable.

The menu displaying unit 22 reads out image data of a menu screen from the storage unit 29 to display it on the display device 5. The menu screen is a screen for selecting work for a desired part.

Figure 6:
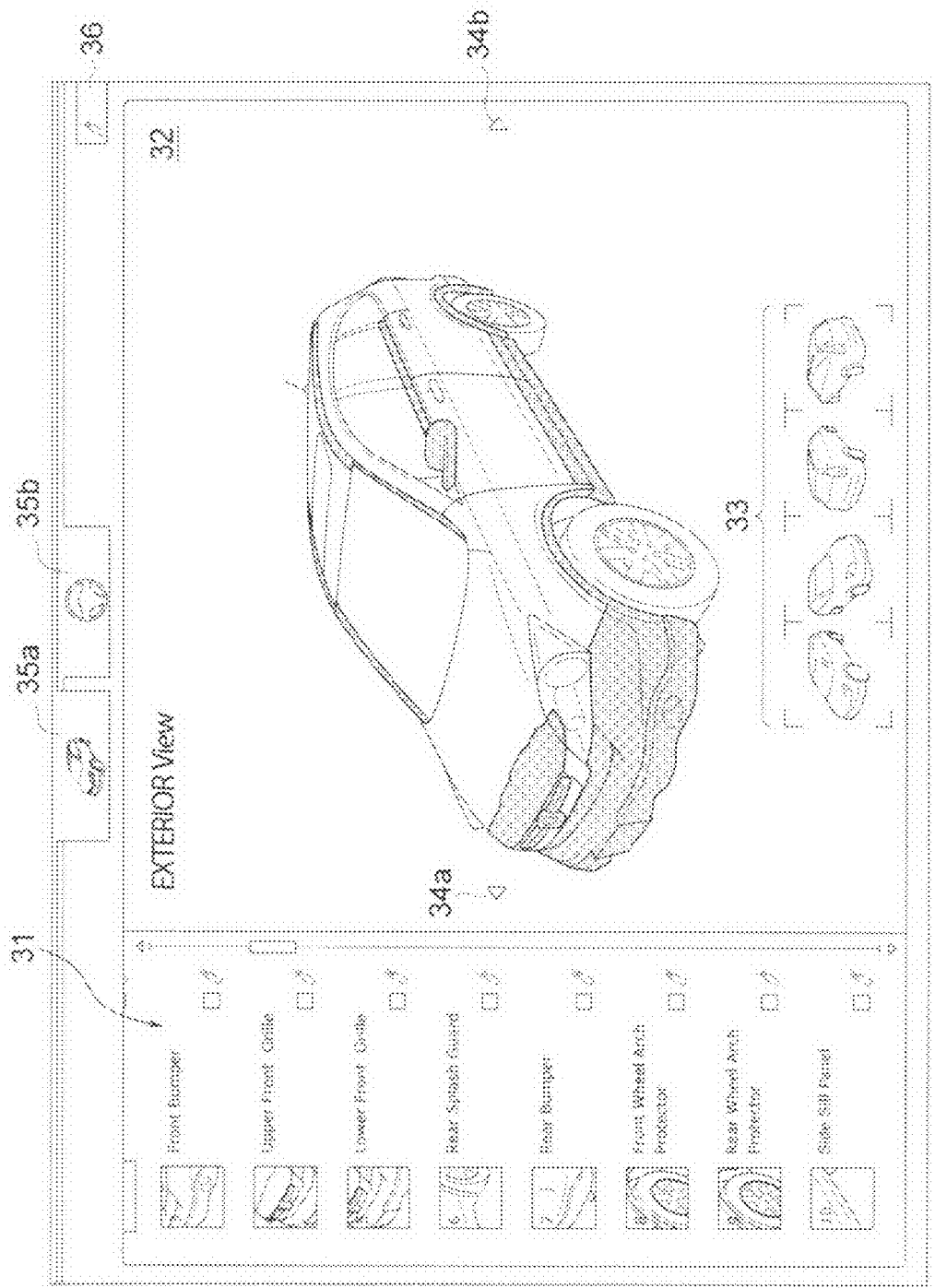
FIG. 6 shows a menu screen (exterior view) in accordance with one embodiment of the present invention.

FIG. 6 shows an example of the menu screen. In an area 31, a list of work steps for the service work of the product is displayed together with names of parts on which the work is to be carried out and thumbnail images for the parts. In an area 32, an image that visually renders the product is displayed. Parts for which the work content is prepared as the moving image data are colored (in the figure, these parts are hatched). When a cursor is positioned at a desired part in the area 31 through the input device 4, the menu displaying unit 22, in response, flashes the corresponding part in the area 32. For example, when the cursor is positioned at "Front Bumper" in the area 31, the front bumper (colored part) in the area 32 starts to flash. In contrast, when the cursor is positioned at the front bumper of the car in the area 32, "Front Bumper" of the area 31 is colored (for example, it is red-colored).

"Rear Bumper" in the area 31 is not seen in the car that faces in the direction shown in the area 32. If the cursor is positioned at "Rear Bumper" in the area 31, the menu displaying unit 22, in response, reads out and displays the image data where the car faces in the opposite direction such that the rear bumper is seen in the area 32.

Further, in response to a desired direction being selected in an area 33, the menu displaying unit 22 reads out the image data where the car faces in the selected direction from the storage unit 29 and then displays it in the area 32.

When an arrow button of 34a or 34b is selected, the menu displaying unit 22 reads out from the storage unit 29 the image data where the car has been rotated by predetermined degrees in the direction shown by the arrow and then displays it in the area 32. The arrow 34a indicates that the car is rotated clockwise and the arrow 34b indicates that the car is rotated counterclockwise.

An icon 35a and an icon 35b for selecting an exterior view and an interior view, respectively, are provided. FIG. 6 is the exterior view, which is a default screen when the menu screen is initially displayed. The exterior view displays a list of work for removing exterior parts of the car.

Figure 7:
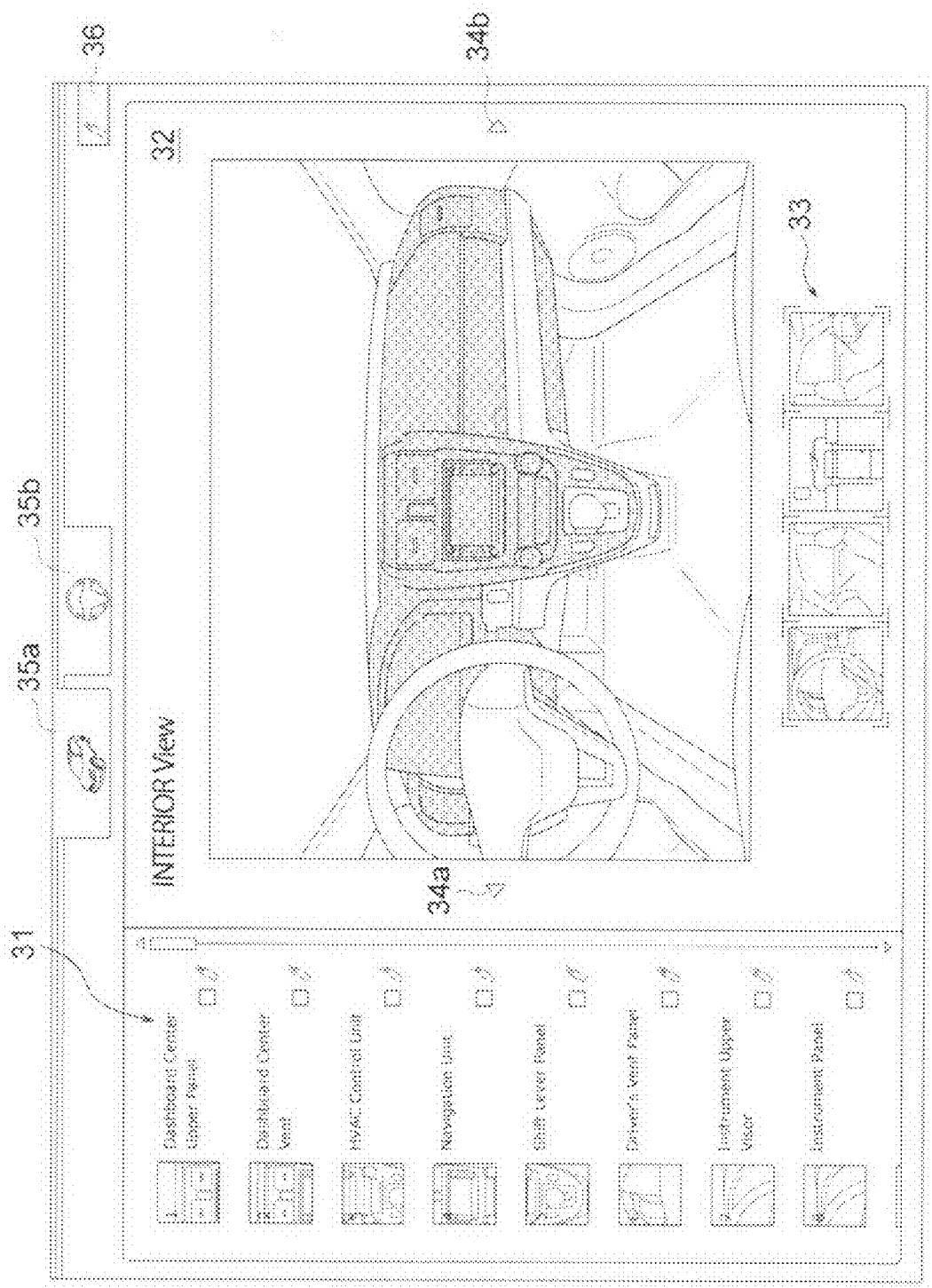
FIG. 7 shows a menu screen (interior view) in accordance with one embodiment of the present invention.

When the icon 35b for the interior view is selected, the menu displaying unit 22 reads out the menu screen as shown in FIG. 7 from the storage unit 29 and displays it. A list of work for removing interior parts of the car is displayed in the area 31 and an image that renders the interior of the car is displayed in the area 32. The configuration of the interior view is similar to the configuration of the exterior view. A desired direction can be selected through the area 33, the button 34a and the button 34b.

The icons 35a and 35b are provided in the subsequent screens. Quick return to the menu screen can be achieved via these icons.

A worker can select a part on which work is to be carried out in the area 31 through the input device 4. Alternatively, a worker can select, from the red-colored parts in the area 32, a part on which work is to be carried out through the input device 4.

A plurality of parts can be selected at one time. In this case, a worker sets flags in check boxes of the area 31. The menu displaying unit 22 stores the selected parts, for example, by writing them into the memory 1b. When an area 36 is selected, the menu displaying unit 22 displays a list of the selected parts in another window (not shown in the figure). By selecting a desired part from the list, a part detail screen, which will be described later, is opened to play back the moving image data of the work content for the selected part. The area 36 is provided in all of the below-described screens. Therefore, the area 36 is convenient for a worker to sequentially view the part detail screens and the work contents (moving image data) of a plurality of parts without returning to the menu screen.

Figure 8:
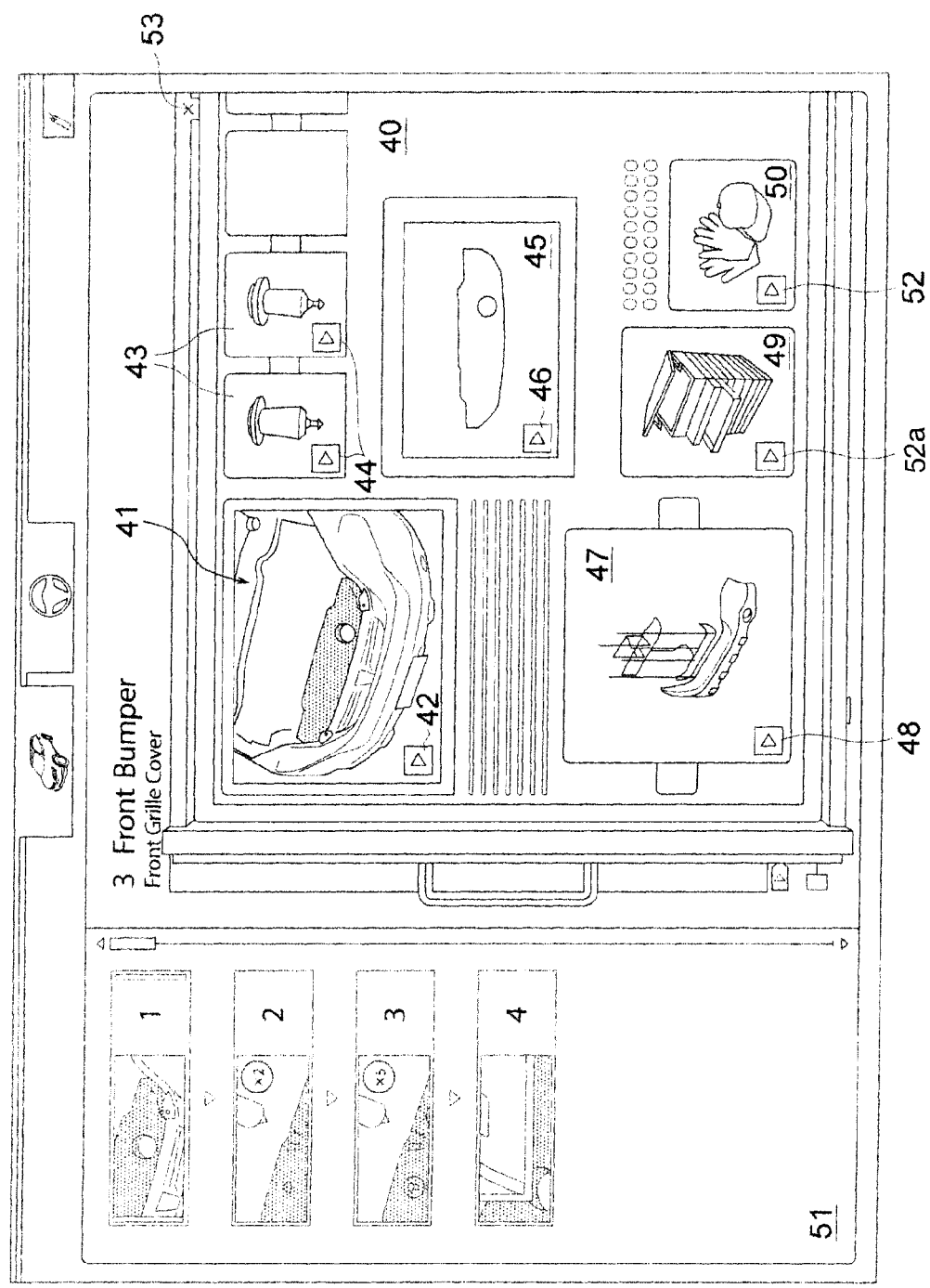
FIG. 8 shows a part detail screen and an index displaying area in accordance with one embodiment of the present invention.

In response to a desired part being selected in the menu screen, a part detail screen displaying unit 23 refers to the part detail screen field of the work information table as shown in FIG. 4 to identify image data of the part detail screen corresponding to the work step of the selected part, reads out the image data, and then displays it on the display device 5. FIG. 8 shows an example of the part detail screen when the front bumper is selected. Among three steps A1 to A3 associated with the front bumper, a detail screen 40 for the first step A1 (that is, a step for removing the front grille cover) is displayed in a window.

An area 41 displays a portion of the first frame of the moving image data of the step. In response to a button 42 being selected, the part detail screen displaying unit 23 reads out the moving image data of the step from the storage unit 29 and starts playing back the moving image data through the player.

An area 43 displays an image of a fastener used for fitting the part. In response to a button 44 being selected, the part detail screen displaying unit 23 reads out, from the storage unit 29, moving image data (animation) that renders an operation for removing the fastener with a tool and plays back the moving image data in a newly opened window. Thus, a worker can visually check in advance the fitting principle for the fastener through the moving image data.

An area 45 displays a shape of the part that has been removed from the car. In response to a button 46 being selected, the part detail screen displaying unit 23 opens another window. In response to an operation for selecting a predetermined icon in the window thus opened, the part detail screen displaying unit 23 reads out form the storage unit 29 and playing back moving image data where the part is rendered while being rotated so as to display the shape of the part to be removed. Further, in response to an operation for selecting another icon in the window thus opened, the part detail screen displaying unit 23 displays an enlarged image of the part or an image for enabling a worker to check the spot at which the fastener is positioned for fitting the part in the main body (not shown in the figure).

An area 47 displays an exploded view for attachment of the part. In response to a button 48 being selected, the part detail screen displaying unit 23 enlarges the exploded view and displays it in another opened window. In the window thus opened, a button for printing is provided. In response to this print button being selected, the part detail screen displaying unit 23 initiates a printing function that is provided in the computer 1 to print the exploded view.

In response to a button 52*a* or a button 52 of an area 49 or an area 50 being selected, the part detail screen displaying unit 23 displays one or more tools that are required for removing the part from the car. For example, in response to the button 52*a* of the area 49 being selected, the part detail screen displaying unit 23 displays the shape or the like of the tool in another window. In response to the button 52 of the area 50 being selected, the part detail screen displaying unit 23 reads out from the storage unit 29 moving image data that renders a tool, such as gloves, which a worker should wear and plays back the moving image data in another window.

Further, in response to a desired part being selected in the menu screen, an index displaying unit 24 refers to the index field of the work information table as shown in FIG. 4, reads out a static image of the work step of the selected part from the storage unit 29, and then displays it as an index in the area 51. In this example, the step A1 includes four sub-steps. Accordingly, in the area 51, static images of the first to fourth sub-steps and the corresponding numbers 1 to 4 are displayed as indexes. In this embodiment, each static image is a portion of the first frame of the moving image data of the corresponding sub-step. Such a static image enables a worker to estimate the position in time of the sub-step with respect to the step A1.

Alternatively, instead of the first frame, another frame may be used as a static image as long as it belongs to the corresponding sub-step.

In response to the button 42 in the area 41 being selected, a moving image playback controlling unit 25 (FIG. 5) identifies a moving image data file associated with the work step of the part by referring to the moving image data field of the work information table as shown in FIG. 4, reads out it from the storage unit 29, and then starts playing back the moving image data via the player. Alternatively, in response to the part detail screen 40 being closed through the button 53, playback of the moving image data can be started.

As described above, when the selected part is the front bumper, there are the steps A1 and A2 as the additional work and the step A3 as the main work. The moving image playback controlling unit 25 can read out the moving image data from the storage unit 29 in order of the steps A1, A2 and A3 to continuously play back the moving image data for all the three steps. Images being played back on the display device 5 can be switched at any time point among the steps A1 to A3, which will be described later.

Figure 9:
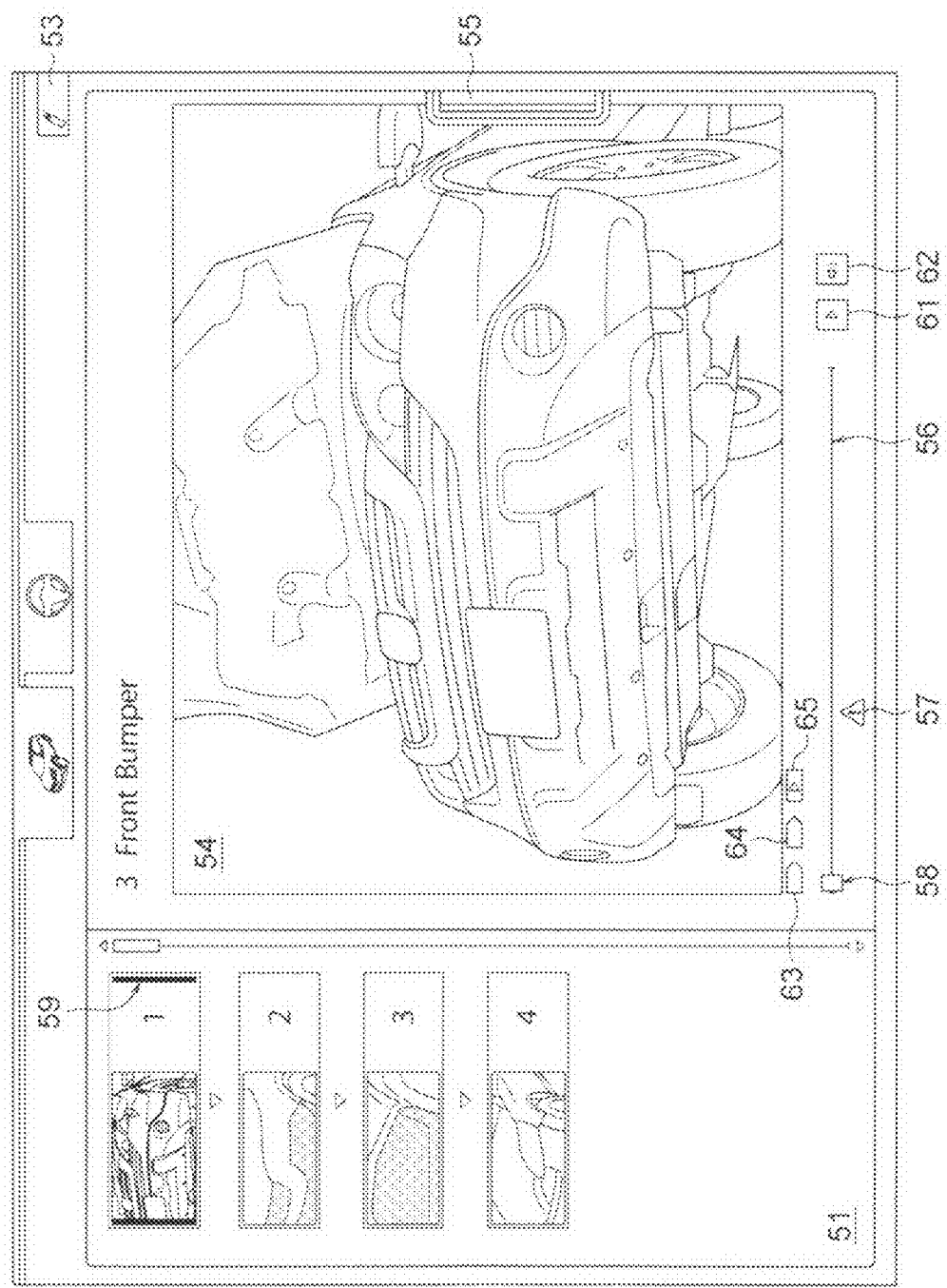
FIG. 9 shows an exemplary screen in which a first frame of moving image data for a first sub-step is displayed in accordance with one embodiment of the present invention.

In the following description, the moving image data of the step A3 that represents the main work for the front bumper will be used as an example. FIG. 9 shows an exemplary screen displayed on the display device 5 when the moving image data for the step A3 is paused at the first frame. In an area 51, which is an index display area similar to FIG. 8, static images of the sub-steps of the step A3 are displayed as indexes. Because this screen indicates a starting point of the moving image data, a bar (bold line) 59 is rendered at the index "1" of the first sub-step. In an area 54, the moving image data is played back. By selecting an area 55, the part detail screen displaying unit 23 displays again in the area 54 a window for the part detail screen corresponding to the part.

When playing back the moving image is started by the moving image playback controlling unit 25, a time bar displaying unit 26 reads out data for graphically displaying a time bar from the storage unit 29 and displays it below the area 54 as a time bar 56. The time bar 56 is created in advance to have a predetermined length and stored in the storage unit 29. The time bar 56 visually represents a time line of the work as described above referring to FIG. 3. The length of the time bar corresponds to the total playback time of the moving image data.

Further, the moving image playback controlling unit 25 refers to the attention work field of the work information table as shown in FIG. 4 to identify the frame number of the attention work occurrence timing and then displays a predetermined mark 57 at a corresponding position on the time bar 56. In this example, the frame number of the attention work occurrence timing is (n2+1) as shown in FIG. 4. Therefore, the mark 57 is placed at a position corresponding to the frame having the number (n2+1). For example, assuming that the length of the time bar is L and this length corresponds to N frames, the position of the mark with respect to the starting point of the time bar can be calculated in real time by (L×(n2+1))/N. The mark 57 is placed at the position thus calculated. Alternatively, the position of the mark 57 may be calculated in advance and stored in the work information table as shown in FIG. 4. The shape of the mark 57 shown in FIG. 9 is an example. The shape can be arbitrarily determined.

Thus, the mark 57 indicating the attention work occurrence timing is displayed corresponding to the time bar 56. Such a mark enables a worker to recognize that there is work to be paid attention and to visually recognize a time point when such work occurs.

A slider 58 is provided in the time bar 56. The time bar displaying unit 26 moves the slider 58 such that the slider tracks the progress of the playback of the moving image data. For example, in the above-described example in which the length of the time bar is L and the number of frames is N, the time bar displaying unit 26 moves the slider 58 by L/N toward the right every time one frame is played back. The speed at which the slider 58 is moved may be calculated in real time from the number of frames stored in the work information table as shown in FIG. 4 or may be calculated in advance and stored in the work information table as shown in FIG. 4. In FIG. 9, the slider 58 is placed at the left end of the time bar 56 because FIG. 9 shows a screen at the start of the playback of the moving image data.

The slider 58 can be moved toward the right (the direction of forwarding the moving image) or toward the left (the direction of rewinding the moving image through an operation on the input device 4. If the slider 58 is moved, the moving image playback controlling unit 25 skips to a frame corresponding to a position to which the slider 58 has been moved and then restarts playing back the moving image from the frame. For example, if the slider 58 is moved by L/3 toward the left, the moving image playback controlling unit 25 rewinds the moving image by N/3 frames and then restarts the moving image therefrom. Thus, a worker can repeatedly see desired work content by using the slider 58. Further, a worker can reconfirm the attention work and can easily skip the moving image to a desired time point by using as a guide the position of the mark 57 indicating the attention work occurrence timing.

A button 61 is a play/pause button. An arrow is shown on the button 61 because FIG. 9 is an exemplary screen when the moving image data is temporarily paused. If the button 61 is selected in this situation, the moving image playback controlling unit 25 releases the pause and then resumes playing back the moving image data. At the same time, the moving image playback controlling unit 25 changes the arrow on the button 61 to another expression showing the pause.

A button 62 is provided for controlling a speaker between on and off. If the button 62 is selected while the speaker is on, the moving image playback controlling unit 25 turns off the speaker to erase the sound. If the button 62 is selected while the speaker is off, the moving image playback controlling unit 25 turns on the speaker. When the speaker is on, the sound that occurs during the work is output from the speaker by virtue of the sound data played back with the moving image data.

Because there are the three steps A1 to A3 in the work of this part, three buttons 63 to 65 corresponding to the three steps are provided. Because the step A3 is currently selected, an arrow is shown on the button 65.

For example, if the button 63 is selected in this situation, the moving image playback controlling unit 25 identifies the moving image data of the step A1 by referring to the moving image data field of the work information table as shown in FIG. 4, reads out the moving image data from the storage unit 29, and then plays back the moving image data. Further, the index displaying unit 24 refers to the index field of the work information table, reads out the static images of the sub-steps included in the step A1 from the storage unit 29, and then displays them as indexes in the area 51.

Thus, a worker can select a desired step from the steps A1 to A3 associated with the front bumper through the buttons 63 to 65 and then quickly start playing back the moving image data for the selected step. Switching images being played back on the display device can be performed at any time point. Such switching can be performed even during playback of the moving image data for any step.

Further, in response to a selection of a desired index that is displayed as a static image assigned a specific number in the area 51, the moving image playback controlling unit 25 starts playing back the moving image from the first frame of the sub-step corresponding to the selected index. For example, in response to an index being selected, the moving image playback controlling unit 25 refers to the frame number field of the work information table as shown in FIG. 4 to identify a first frame of the sub-step of the selected index and then starts playing back from the first frame. Such switching of images being played back between sub-steps can be performed at any time point. The switching can be performed even during playback of the moving image data for any sub-step. When such skip operation for the moving image data is performed during a step, during a sub-step, between steps or between sub-steps, the time bar displaying unit 26 moves the slider 58 of the time bar 56 such that the slider is placed at a position corresponding to a frame after the skip operation.

Figure 10:
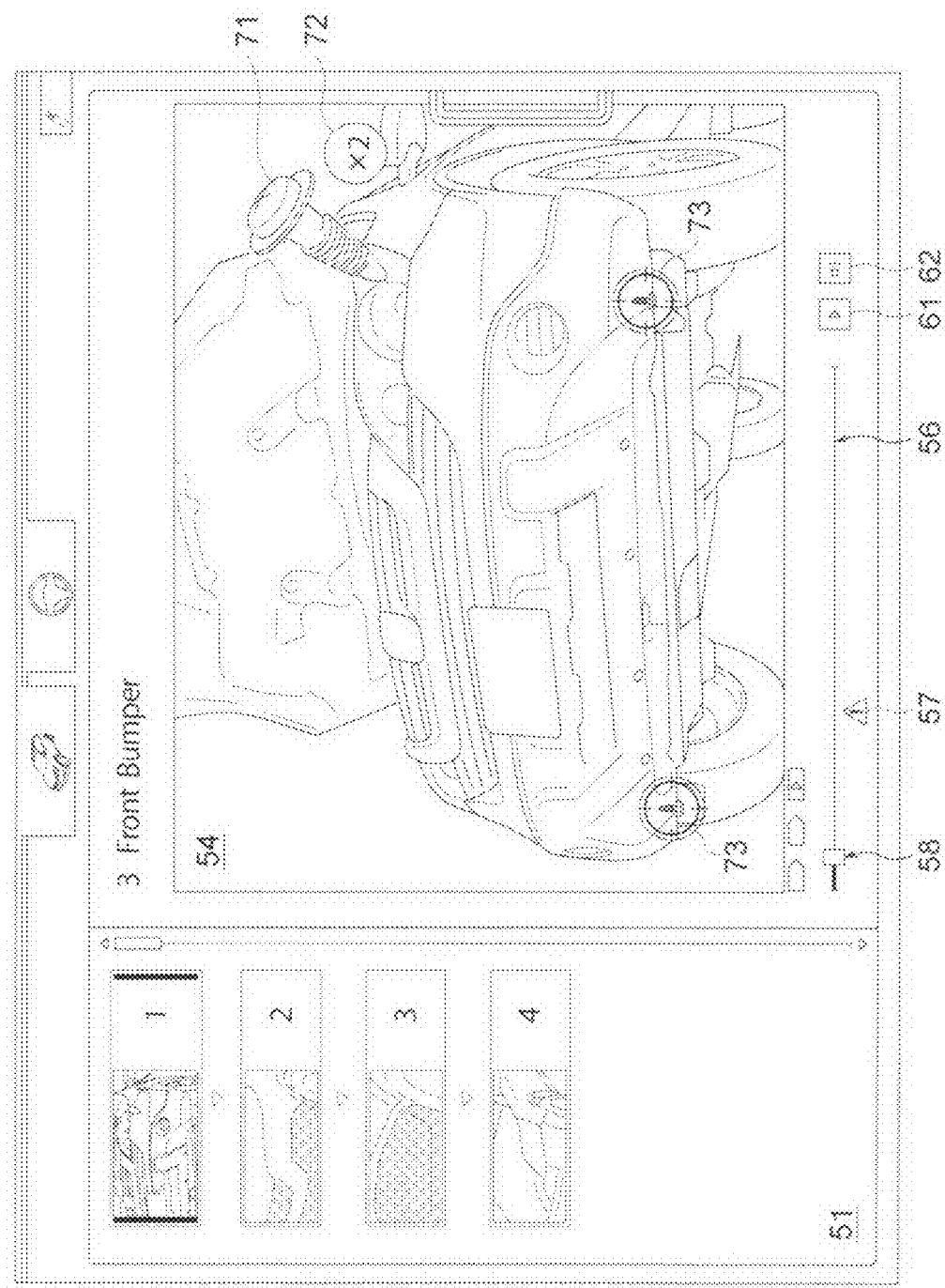
FIG. 10 shows an exemplary screen in which a frame of moving image data for a first sub-step is displayed in accordance with one embodiment of the present invention.

FIG. 10 shows an exemplary screen displayed after the moving image data has moved forward a bit from FIG. 9. Because the time bar displaying unit 26 moves the slider 58 toward the right in accordance with the progress of the moving image data as described above, the slider 58 is positioned to the right with respect to the position shown in FIG. 9.

A frame displayed in the area 54 is created such that the number of fasteners as shown by reference numeral 71 is two as shown by reference numeral 72 and these two fasteners are placed at spots as shown by areas 73. Therefore, this frame represents the operation (work) for removing these fasteners. The used fasteners are displayed in an enlarged form as shown by the reference numeral 71. The number of the fasteners is clearly displayed as shown by reference numeral 72. Therefore, a worker can quickly understand what fasteners are to be removed and how many fasteners are to be removed. Further, in this embodiment, the reference numerals 72 and 73 are displayed in a color (for example, red or green) different from the color of the car in the background for attracting the worker's attention. Therefore, the worker can easily and visually recognize where the fasteners are placed.

Figure 11:
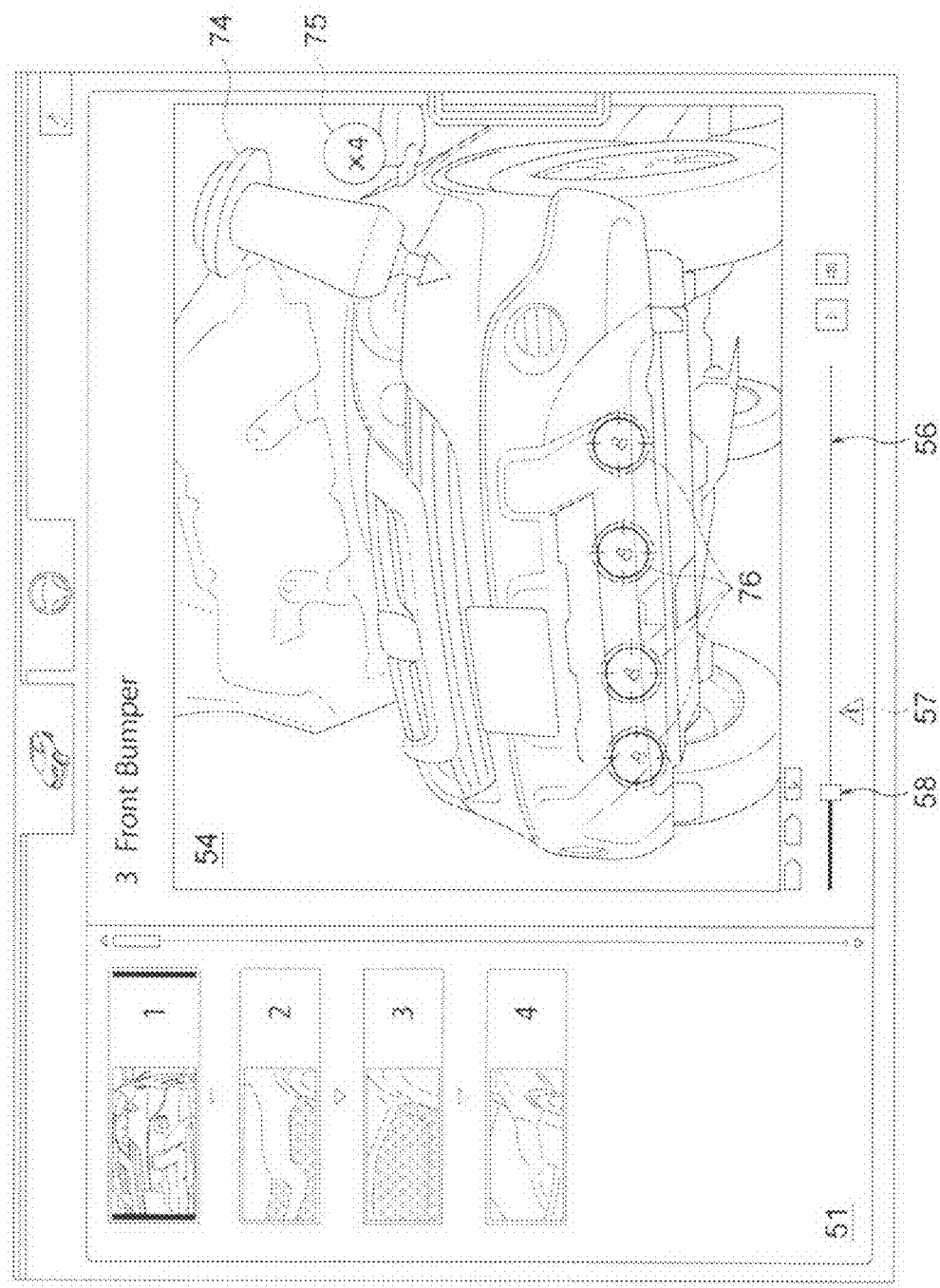
FIG. 11 shows an exemplary screen in which a frame of moving image data for a first sub-step is displayed in accordance with one embodiment of the present invention.

FIG. 11 shows an exemplary screen after the moving image data has moved forward a bit from FIG. 10. A frame displayed in the area 54 is created such that the number of fasteners as shown by reference numeral 74 is four as shown by reference numeral 75 and these fasteners are placed at spots as shown by areas 76. Therefore, this frame represents operation (work) for removing these fasteners.

Figure 12:
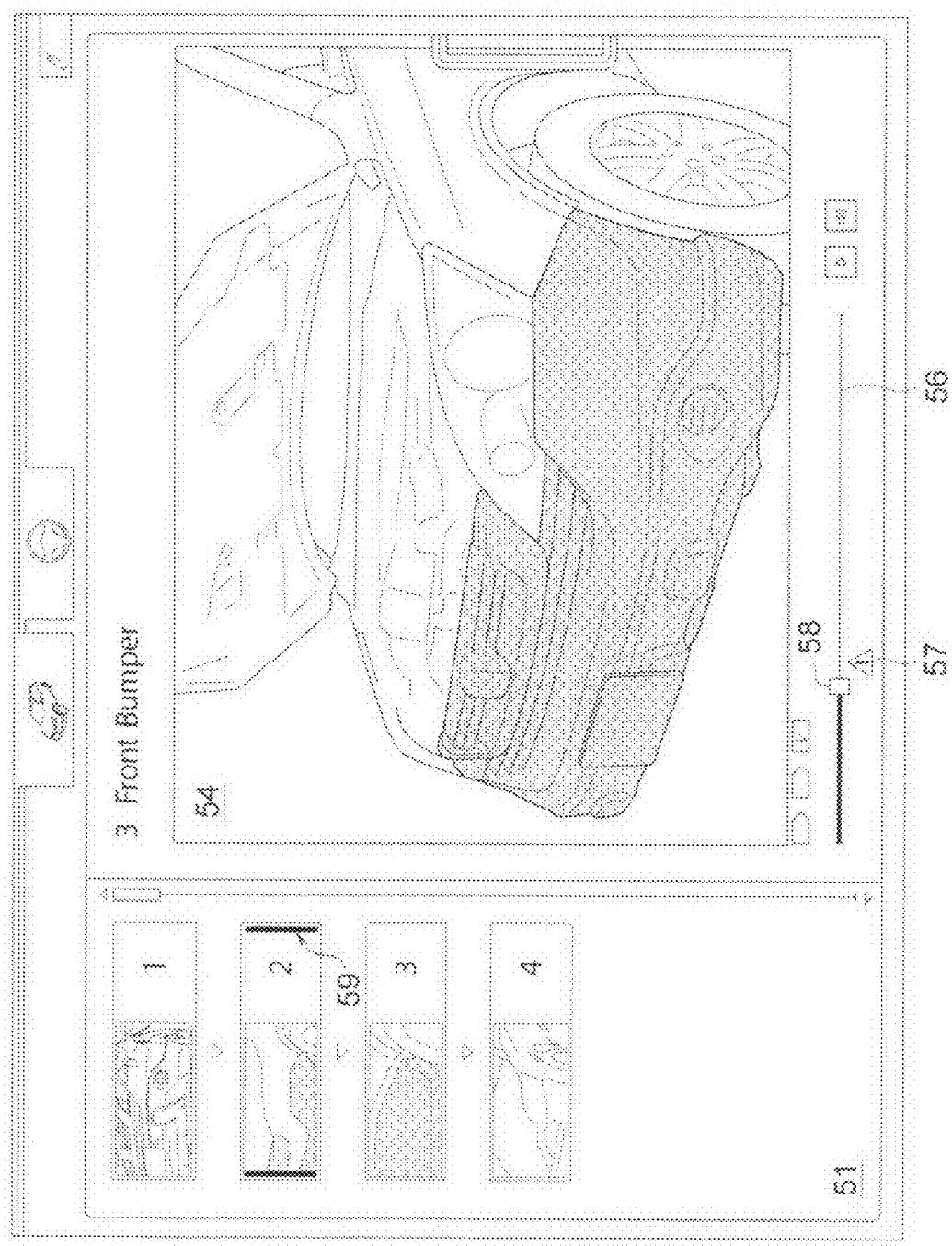
FIG. 12 shows an exemplary screen in which a first frame of moving image data for a second sub-step is displayed in accordance with one embodiment of the present invention.

After the moving image playback controlling unit 25 completes playing back the moving image data corresponding to the first sub-step, the unit 25 continues to play back the moving image data corresponding to the second sub-step. FIG. 12 shows an exemplary screen in which the first frame of the moving image data corresponding to the second sub-step is displayed in the area 54. When the moving image data of the second sub-step is started, the index displaying unit 24 erases the bar 59 at the index "1" in the area 51 and renders the bar 59 at the index "2" to indicate that the second sub-step is started. In order to cause a worker to confirm the part to be removed (which is the front bumper in this example), this frame is created such that the front bumper is colored in the area 54.

Figure 13:
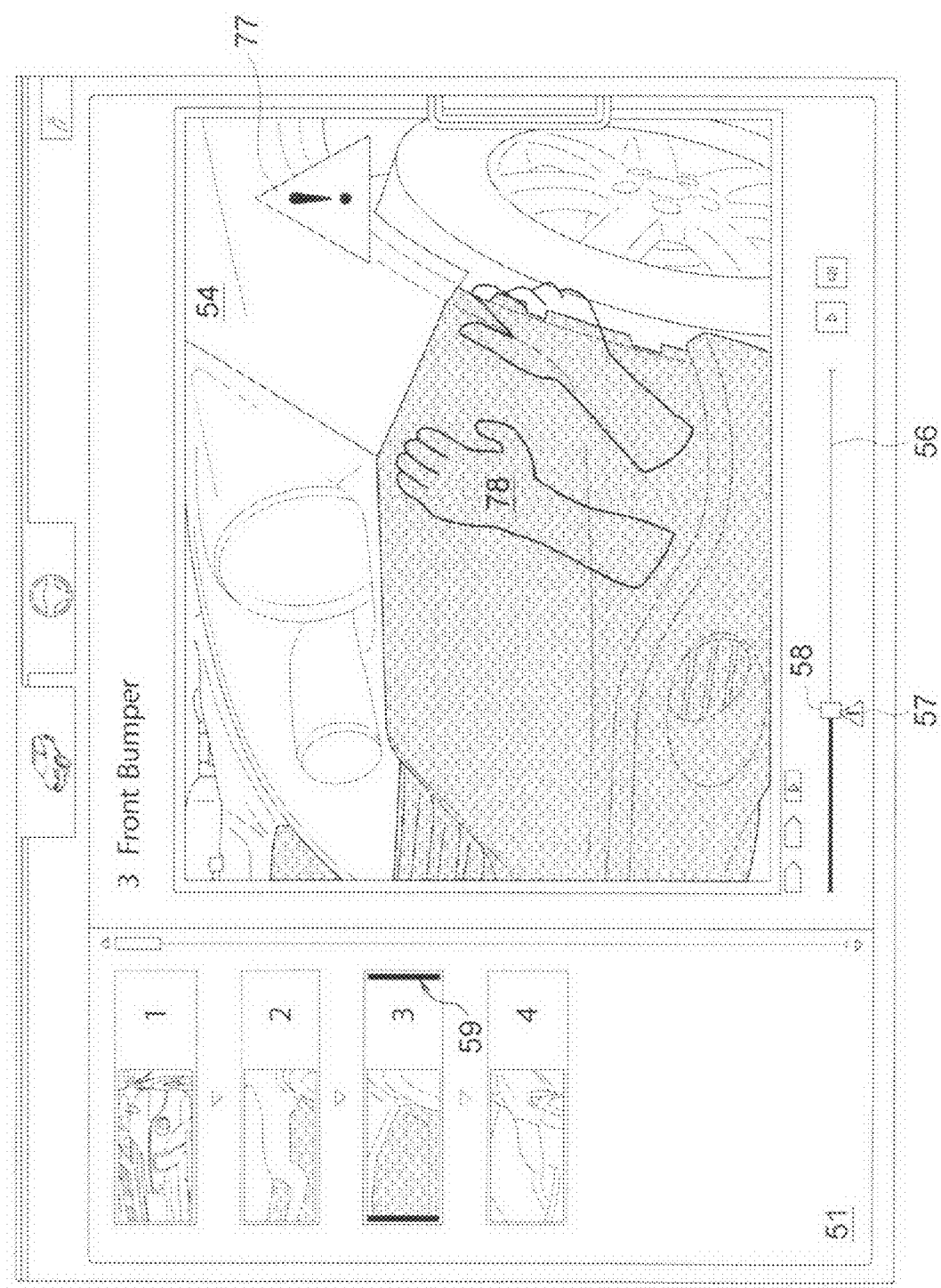
FIG. 13 shows an exemplary screen in which a frame of moving image data for a third sub-step is displayed in accordance with one embodiment of the present invention.

After the moving image playback controlling unit 25 completes playing back the moving image data corresponding to the second sub-step, the unit 25 continues to play back the moving image data corresponding to the third sub-step. FIG. 13 shows an exemplary screen in which the first frame of the moving image data corresponding to the third sub-step is displayed in the area 54. When the moving image data of the third sub-step is started, the index displaying unit 24 erases the bar 59 at the index "2" in the area 51 and renders a bar 59 at the index "3" to indicate that the third sub-step is started.

In this example, as described above referring to FIG. 3, the attention work occurrence timing is set in the first frame of the third sub-step. A frame representing the attention work is created in such a manner as to display a mark 77 that indicates the attention work. Referring to the time bar 56, it is seen that the slider 58 has reached the position of the mark 57 indicating the attention work.

In this exemplary embodiment, the moving image data corresponding to the work content at the attention work occurrence timing is created in such a manner as to include moving image data indicating an incorrect work sample paired with moving image data indicating a correct work sample. The latter is played back subsequently to the playback of the former. The first frame of the former is displayed in the area 54 of FIG. 13.

Figure 14:
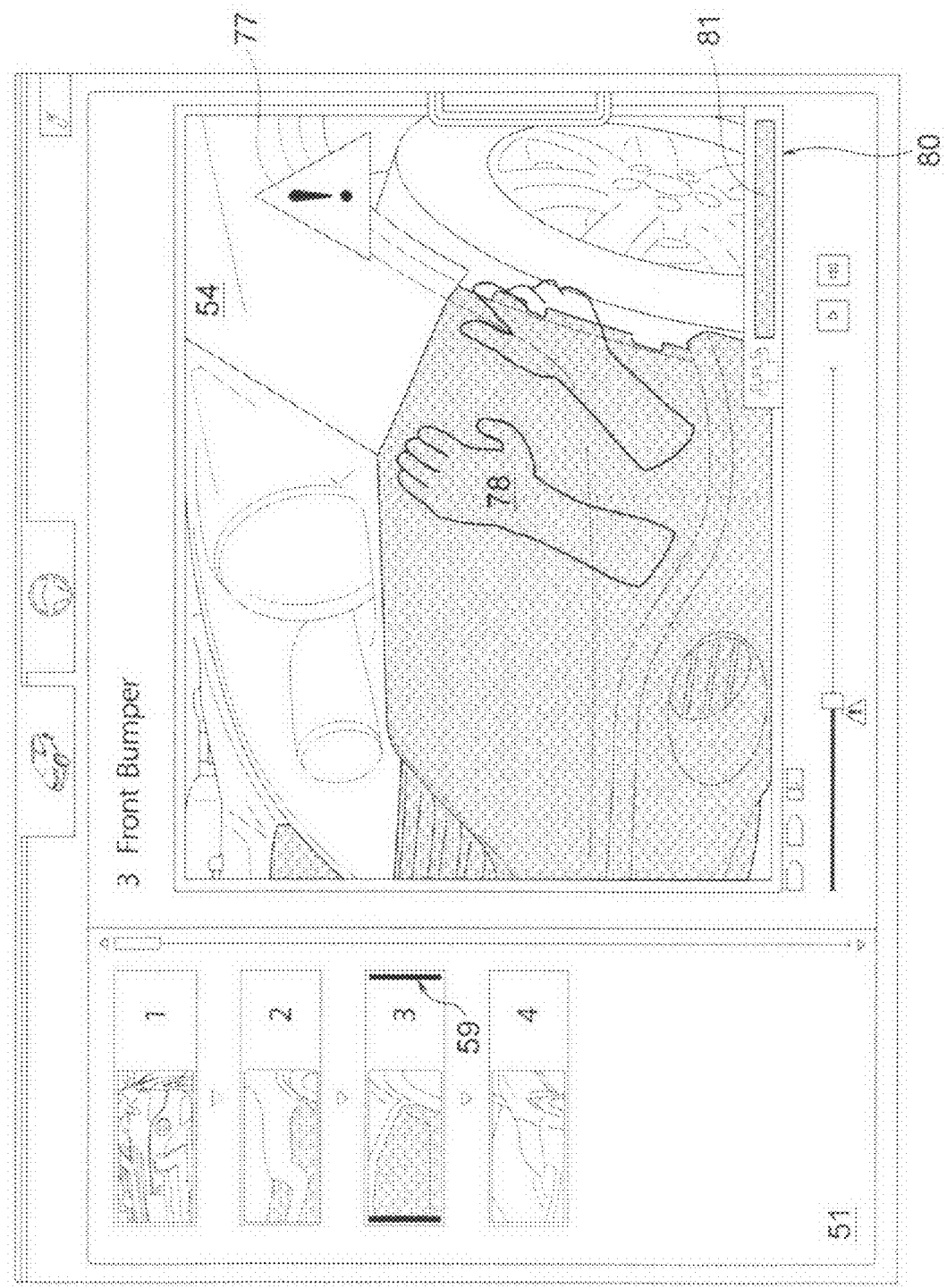
FIG. 14 shows an exemplary screen in which a frame of moving image data for a third sub-step is displayed so as to indicate an example of incorrect work in accordance with one embodiment of the present invention.

Referring to FIG. 14, an exemplary screen after the moving image data has moved forward a bit from FIG. 13. A frame displayed in the area 54 is a frame included in the frame range P33 in the power scale field of the work information table shown in FIG. 4. Therefore, in response to a frame played back by the moving image playback controlling unit 25 being included in the range P33, a power scale displaying unit 27 reads out data for graphically displaying a work power scale from the storage unit 29 and then displays it as a work power scale 80. Further, the power scale displaying unit 27 refers to the data PL33 in the power line field of the work information table shown in FIG. 4 to identify a length of the power line to be displayed on the power scale and then displays a line 81 having the identified length on the work power scale 80. The power line 81 visually represents a degree of a power (force) that is applied by the hands 78 rendered in the frame. As the length of the power line is longer, it is indicated that the power is stronger. In this example, the power line 81 reaches the right end of the work power scale 80, which indicates that a relative strong power is being applied by the hands 78.

The data PL33 included in the power line field can be arbitrarily expressed. For example, an actual length of the power line 81 to be displayed may be associated with each of the frames included in the frame range P33 in the power scale field. Alternatively, a ratio of the length 81 of the power line relative to the total length of the work power scale 80 may be associated with each of the frames. Yet alternatively, the frame may be pre-created such that the power scale including the power line of the length as shown in the figure is rendered.

Figure 15:
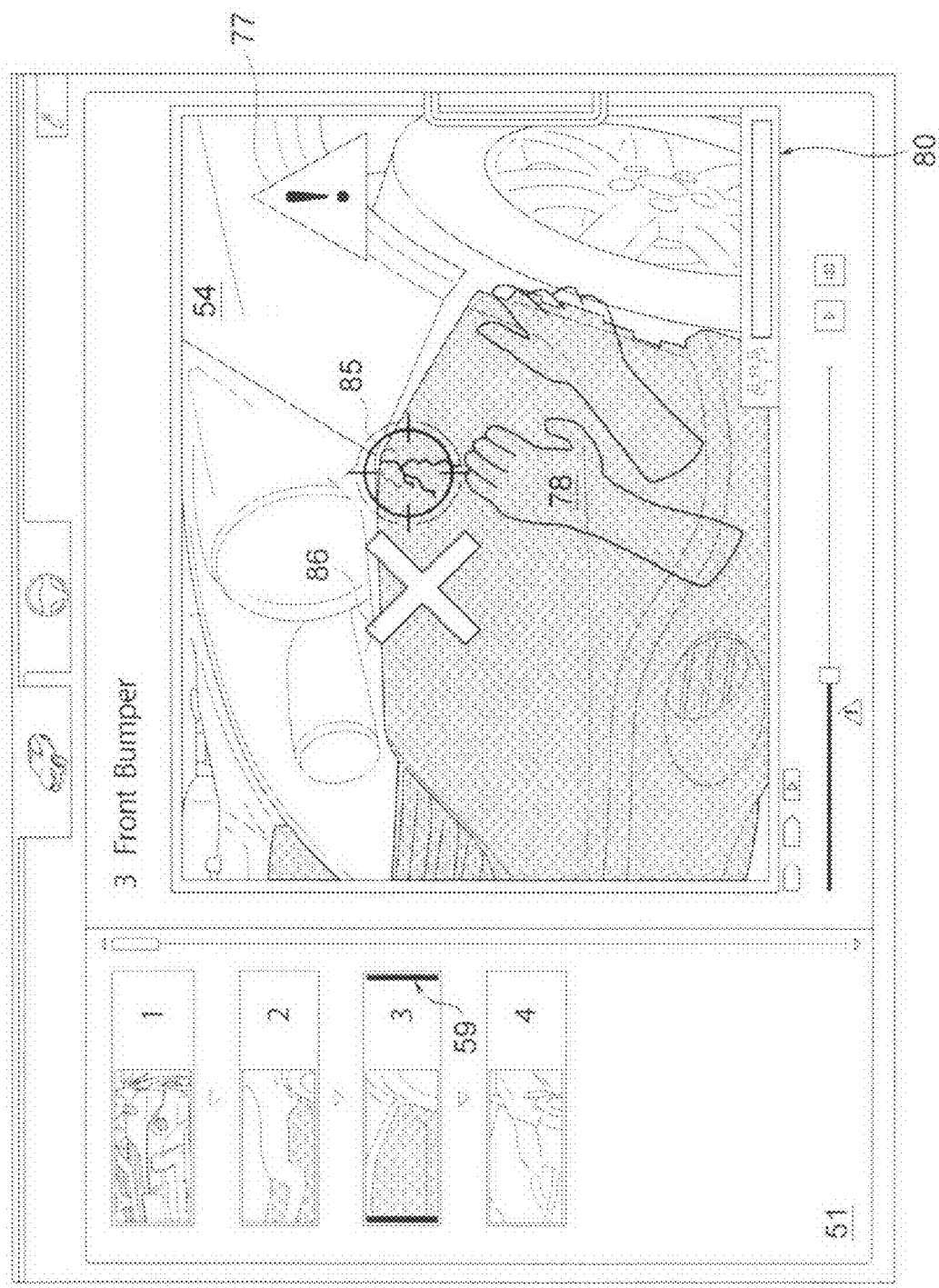
FIG. 15 shows an exemplary screen in which a frame of moving image data for a third sub-step is displayed so as to indicate an example of incorrect work in accordance with one embodiment of the present invention.

FIG. 15 shows an exemplary screen after the moving image data has moved forward a bit from FIG. 14. A frame displayed in the area 54 is created such that a mark 85 indicates that cracking occurs in the front bumper due to the hands applying a relative strong power (force) as shown in FIG. 14. The power scale displaying unit 27 refers to the data PL33 in the power line field of the work information table as shown in FIG. 4. In this example, the power line 81 is not displayed because the length of the power line corresponding to this frame is zero. The same holds true for FIGS. 16-17.

The sound of cracking is added in this frame. If the speaker is on, a worker can hear the sound. Further, the frame is created to render a "x" mark 86, which indicates incorrect work.

Figure 16:
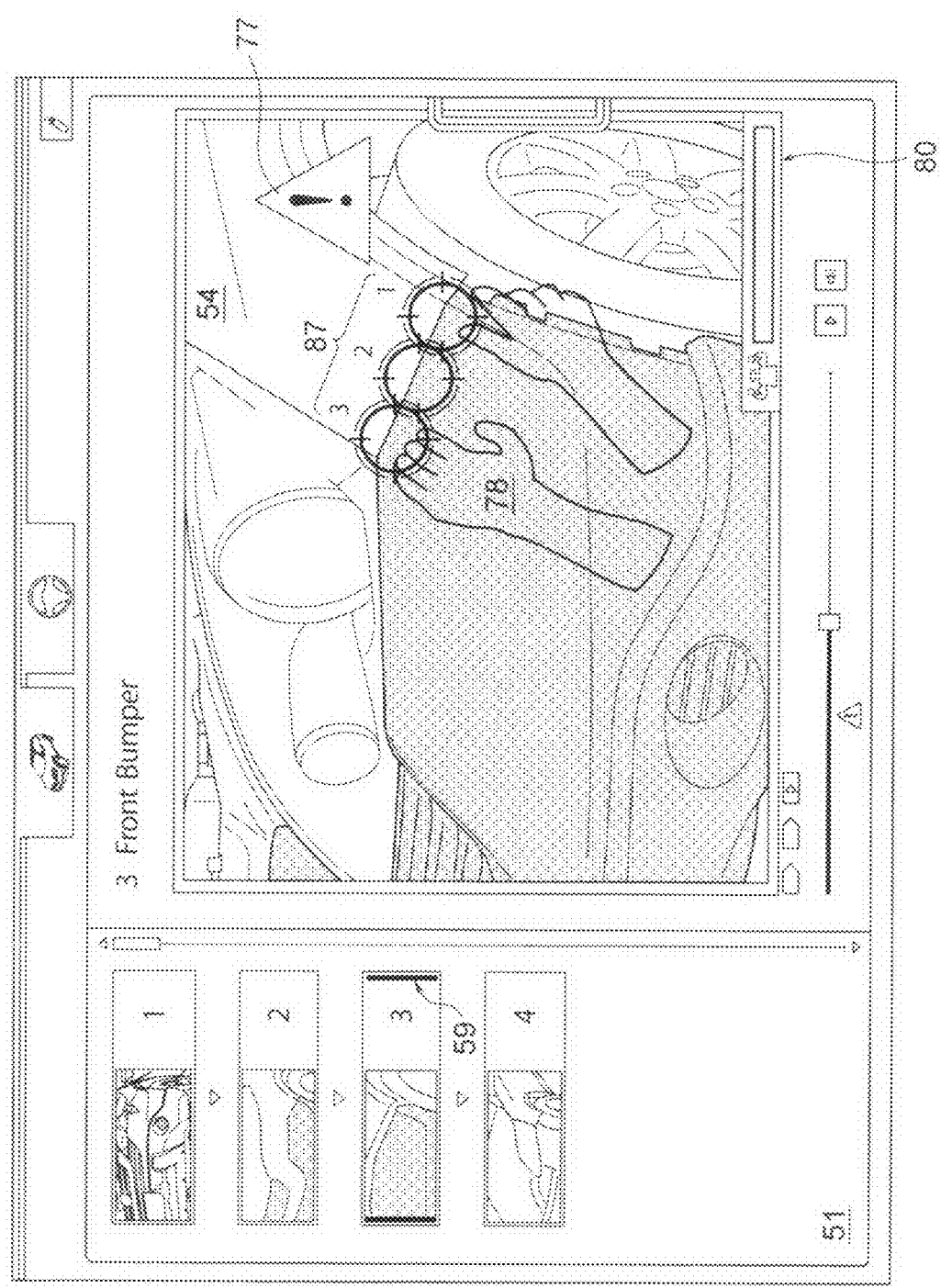
FIG. 16 shows an exemplary screen in which a frame of moving image data for a third sub-step is displayed so as to indicate an example of correct work in accordance with one embodiment of the present invention.

FIG. 16 shows an exemplary screen after the moving image data has moved forward a bit from FIG. 15. A frame displayed in the area 54 is created such that marks as shown by reference numeral 87 indicates three spots at which the front bumper is engaged to the main body. This enables a worker to pay attention to the engagements in removing the front bumper.

Figure 17:
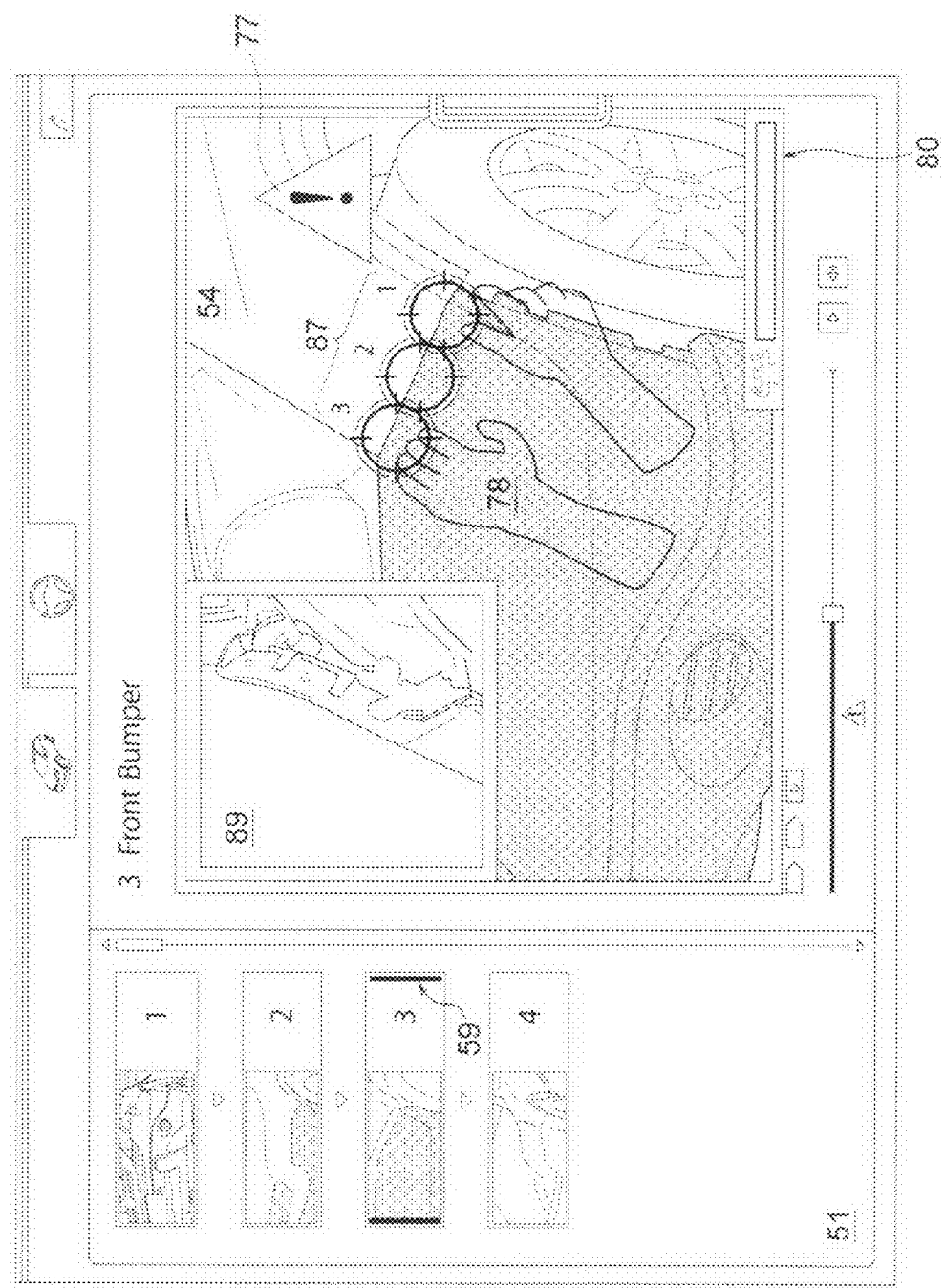
FIG. 17 shows an exemplary screen in which a frame of moving image data for a third sub-step is displayed so as to indicate an example of correct work in accordance with one embodiment of the present invention.

FIG. 17 shows an exemplary screen after the moving image data has moved forward a bit from FIG. 16. A frame displayed in the area 54 is created such that the three engagement spots 87 are displayed in an enlarged form in an area 89. Such a display enables a worker to understand in advance how to carry out the work.

Figure 18:
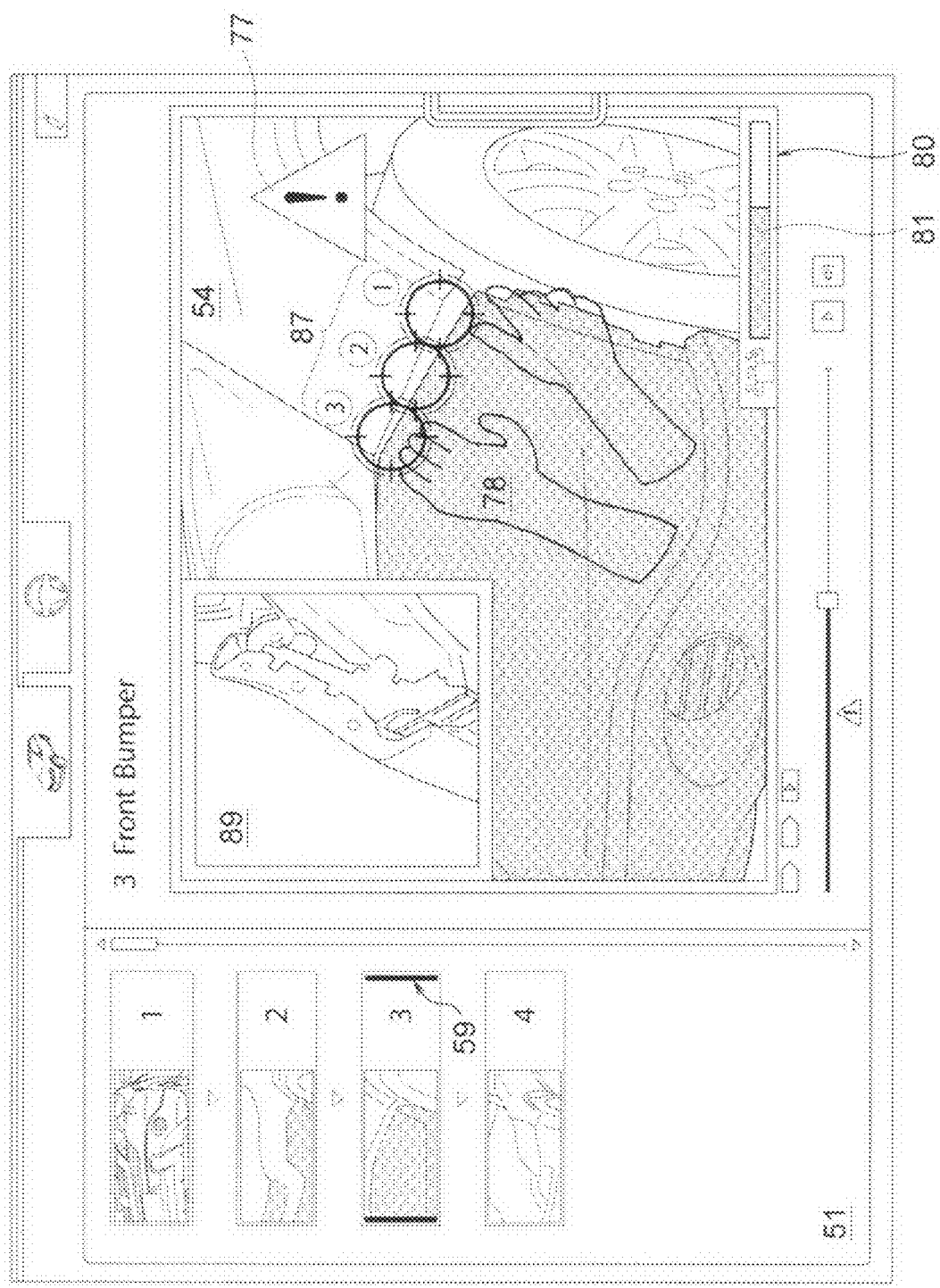
FIG. 18 shows an exemplary screen in which a frame of moving image data for a third sub-step is displayed so as to indicate an example of correct work in accordance with one embodiment of the present invention.

FIG. 18 shows an exemplary screen after the moving image data has moved forward a bit from FIG. 17. The power scale displaying unit 27 refers to the data PL33 in the power line field of the work information table as shown in FIG. 4 to identify a length of the power line corresponding to the frame and then displays the power line 81 on the power scale 80. In this case, the length of the power line 81 is set in advance to be shorter than the length of the power line shown in FIG. 14. Therefore, this frame represents the work for removing the front bumper from the first engagement spot with a weaker power. The area 89 displays a state in which the first engagement has been released.

Figure 19:
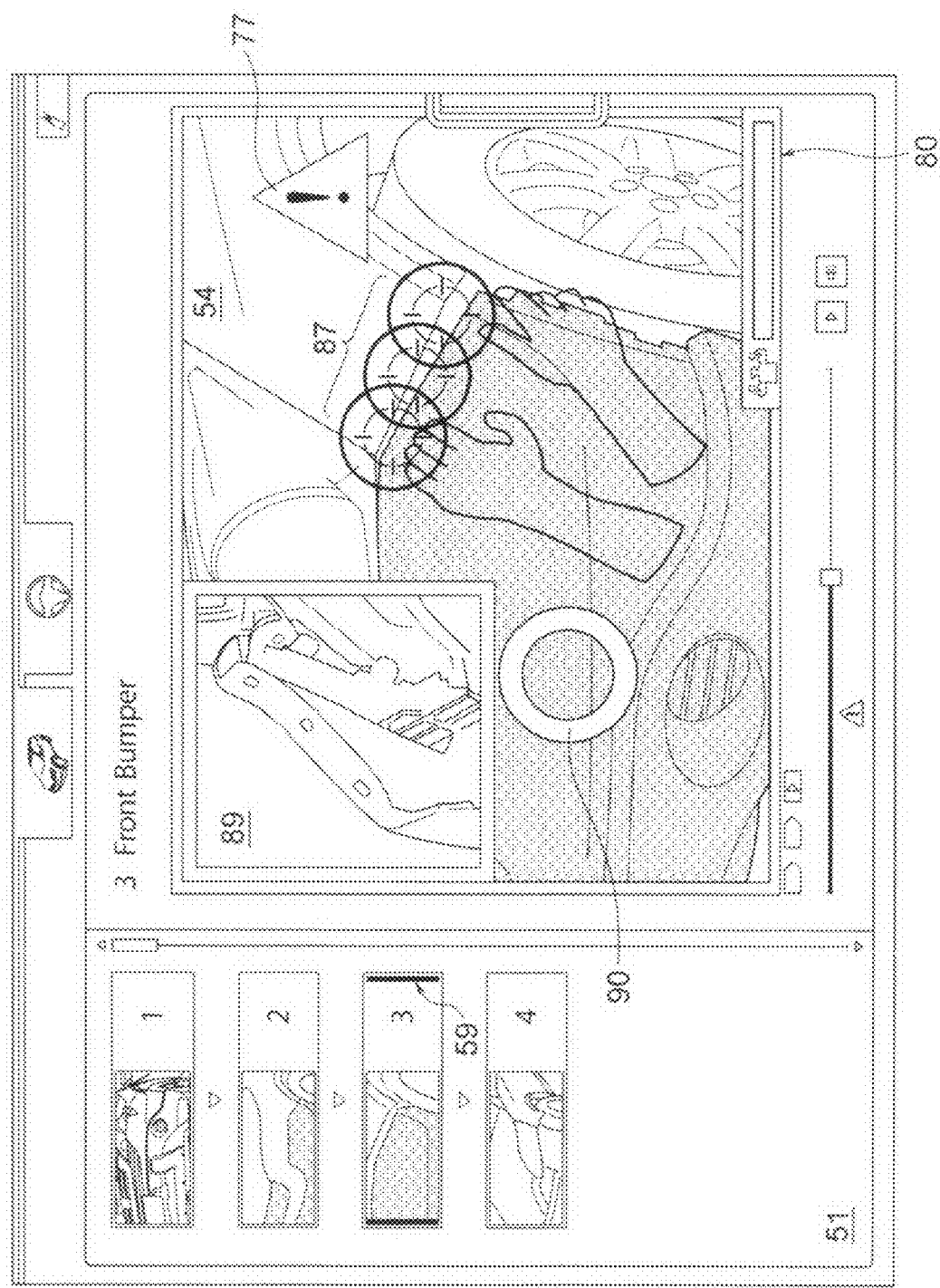
FIG. 19 shows an exemplary screen in which a frame of moving image data for a third sub-step is displayed so as to indicate an example of correct work in accordance with one embodiment of the present invention.

FIG. 19 shows an exemplary screen after the moving image data has moved forward a bit from FIG. 18. This frame is created in such a manner as to display a state where the second and third engagements have been released. This frame is also created in such a manner as to display a "○" mark 90. Thus, it is represented by the frame that the correct work is to sequentially release the three engagements with a weaker power.

Thus, an example of the incorrect work as indicated by the "X" mark is displayed in moving images and then an example of the correct work as indicated by the "○" mark is displayed in moving images. Because a worker confirms the incorrect work prior to the correct work, the worker can more deeply understand the correct work.

In addition, a worker can recognize through a display of the work power scale that he or she should be careful about the degree of the power to be applied. A worker can understand that the degree of the power to be applied is different between the correct work and the incorrect work and hence applying excessive power leads to the incorrect work.

In this example, the attention work occurrence timing is established from the viewpoint of the power applied by the hands 78. However, the attention work occurrence timing can be set from various viewpoints. For example, when a worker should pay attention to how to use a tool, moving images for the incorrect work can be created to indicate an inappropriate use of the tool and moving images for the correct work can be created to indicate an appropriate use of the tool.

Figure 20:
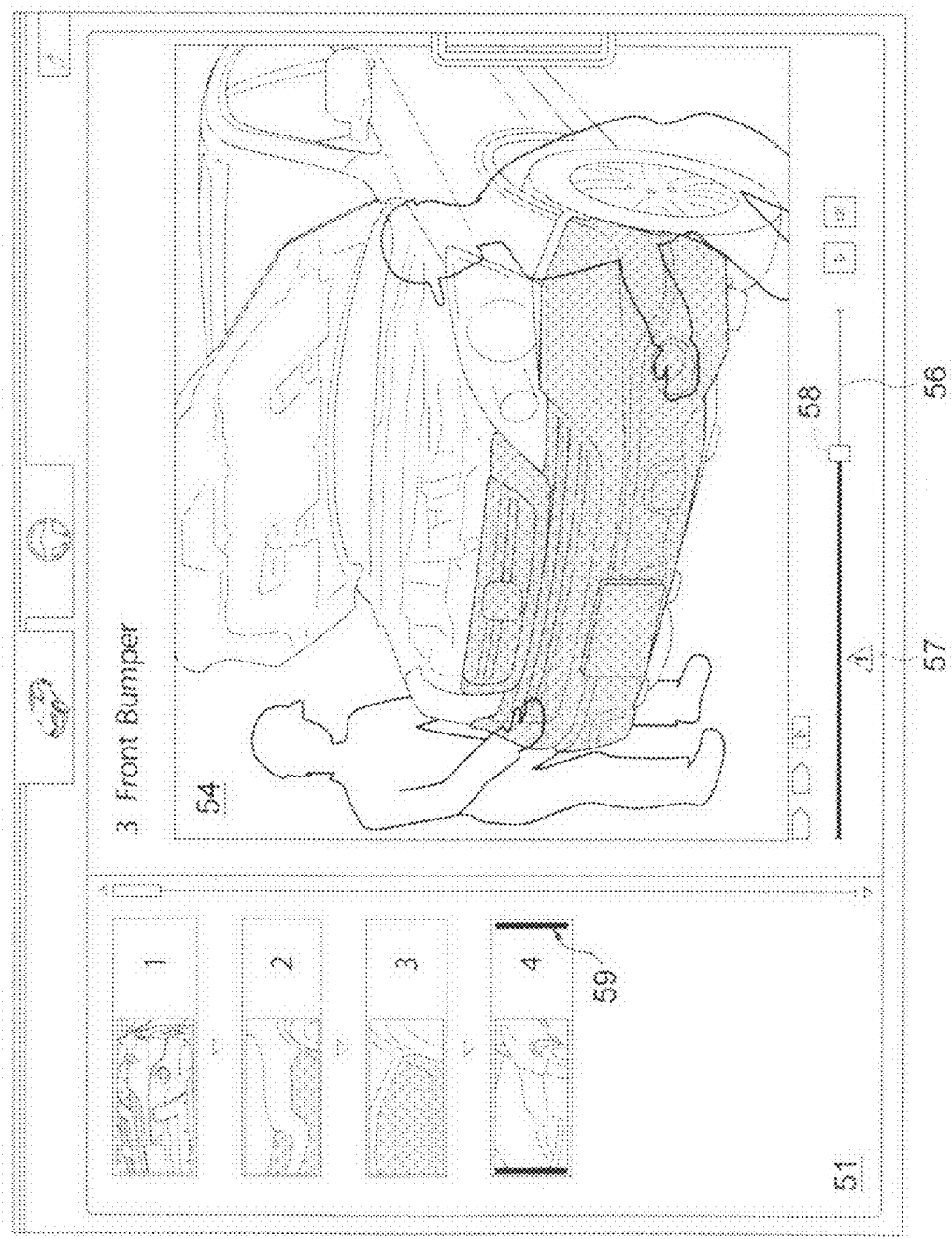
FIG. 20 shows an exemplary screen displaying a first frame of moving image data for a fourth sub-step in accordance with one embodiment of the present invention.

FIG. 20 shows an exemplary screen in which the first frame of the fourth sub-step is displayed in the area 54 by the moving image playback controlling unit 25. This frame is created in such a manner as to render the work by two workers for removing the front bumper. As described above, the index displaying unit 24 renders the bar 59 at the index "4" in the area 51 to indicate that the fourth sub-step is started.

Figure 21:
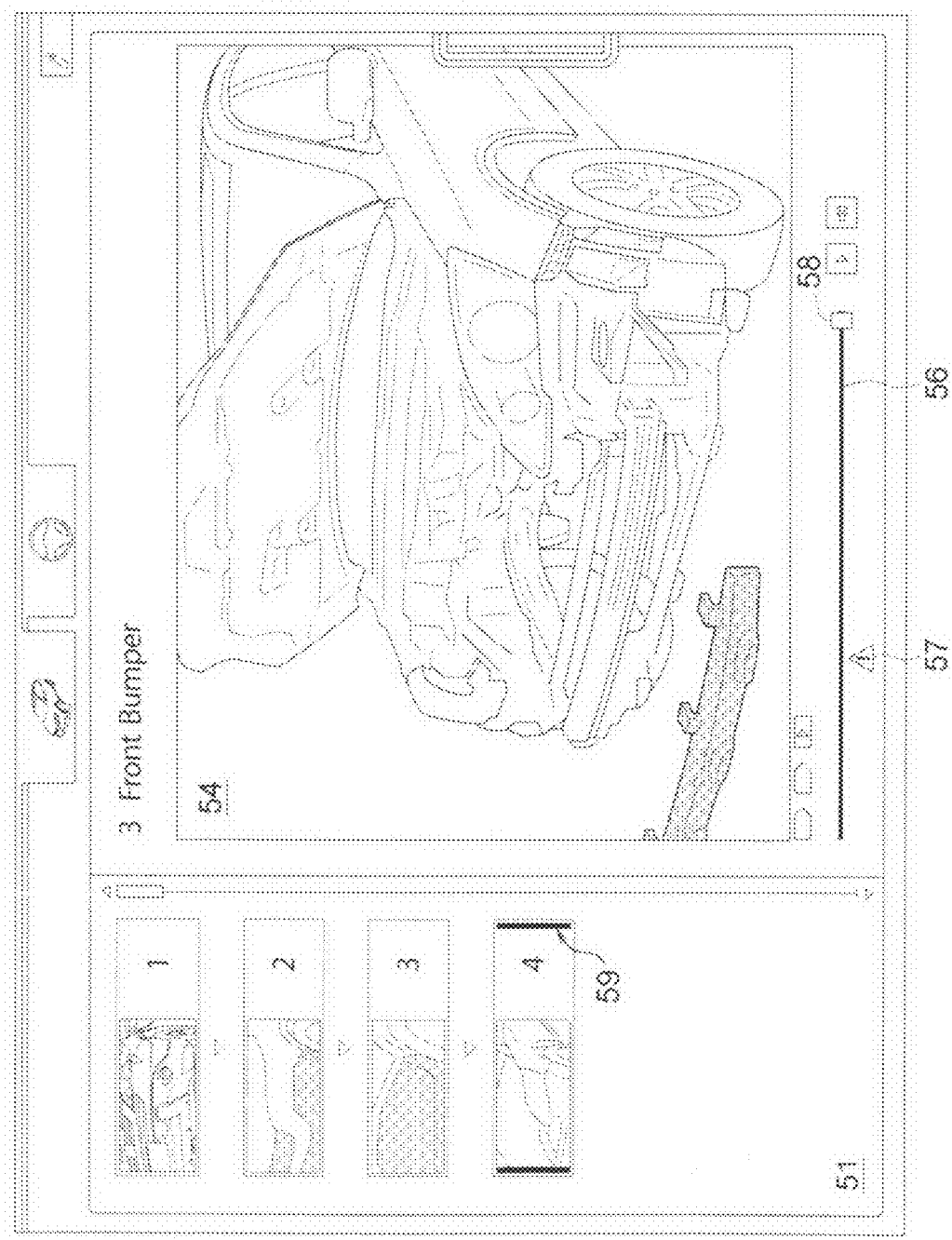
FIG. 21 shows an exemplary screen in which a final frame of moving image data for a fourth sub-step is displayed in accordance with one embodiment of the present invention.

FIG. 21 shows the final frame of the fourth sub-step. This frame is created in such a manner as to render a state where the front bumper has been completely removed. Referring to the time bar 56, the slider 58 is placed at the right end, which indicates that the playback of the moving image data of the step has ended.

In the above embodiments, one or more programs and data used for implementing display of work content according to the invention are pre-stored in the storage medium 3. Alternatively, one or more programs and/or data used for implementing display of work content according to the invention may be pre-stored in any storage, which may be the storage device 1c in FIG. 1, accessible by the computer 1. Thus, the storage unit 29 of FIG. 5, which represents data stored in the storage medium 3 as described above, may be implemented with any storage accessible by the computer 1 (or the control unit as described referring to FIG. 5). For example, the storage unit 29 may be the storage medium 3, the storage device 1 of the computer 1 or a combination thereof. Therefore, a storage unit defined in claims should not be limited to the storage medium 3 or the storage device 1 and may include any storage accessible by the computer (or the control unit).

Although the preferred embodiments of the present invention have been described above, skilled persons in the art will be able to use various techniques in order to implement the functions of the blocks as shown in FIG. 5.

We claim:

1. A computer program for displaying work content stored on a computer-readable storage medium,
the storage medium storing the work content for each of steps of work to be carried out on a product as moving image data;
the program comprising:
in response to a desired step from the steps of the work being selected on a display device, reading the moving image data corresponding to the selected step of the work from the storage medium;
starting playing back the moving image data on the display device;
when starting playing back the moving image data, displaying on the display device a time bar where a progress of the playback of the moving image data is indicated by a slider; and
displaying an occurrence timing of attention work corresponding to the time bar, the attention work being predetermined within the step of the work,
further comprising,
when one or more predetermined images of the moving image data are played back on the display device, displaying a work power scale that indicates a degree of a power that is required for work rendered in the predetermined images,
wherein the moving image data includes, for the attention work, images of a correct work content paired with images of an incorrect work content; and
wherein when the playback of the moving image data reaches the occurrence timing of the attention work, the image of the correct work content are played back after the images of the incorrect work content are play back.

2. The computer program of claim 1, wherein when the playback of the moving image data reaches the occurrence timing of the attention work, images of the moving image data are played back together with a mark that indicates the attention work.

3. The computer program of claim 1, further comprising switching images of the moving image data that are being played back on the display device in accordance with a user operation for moving the slider in the direction where the progress of the playback is moved forward or the direction where the progress of the playback is moved backward.

4. The computer program of claim 1, wherein each step of the work is divided into a plurality of sub-steps;
wherein the computer program further comprises:
displaying, on the display device, a predetermined image of the moving image data corresponding to each sub-step as an index that indicates the sub-step; and
moving the slider to a start time of the sub-step corresponding to the selected index in response to the index being selected.

5. The computer program of claim 1, further comprising:
displaying the product such that parts of the product on which the steps of the work are to be carried out are colored;
in response to one of the colored parts being selected, reading the moving image data of the step for the selected part from the storage medium; and
starting playing back the moving image data on the display device.

6. A computer-implemented method for displaying work content, the work content for each of steps of work to be carried out on a product being stored as moving image data, comprising the steps of:
in response to a desired step from the steps of the work being selected on a display device, reading the moving image data corresponding to the selected step of the work;
starting playing back the moving image data on the display device;
when starting playing back the moving image data, displaying on the display device a time bar where a progress of the playback of the moving image data is indicated by a slider; and
displaying an occurrence timing of attention work corresponding to the time bar, the attention work being predetermined within the step of the work,
further comprising,
when one or more predetermined images of the moving image data are played back on the display device, displaying a work power scale that indicates a degree of a power that is required for work rendered in the predetermined images,
wherein the moving image data includes, for the attention work, images of a correct work content paired with images of an incorrect work content; and
wherein when the playback of the moving image data reaches the occurrence timing of the attention work, the images of the correct work content are played back after the images of the incorrect work content are played back.

7. The method of claim 6, wherein when the playback of the moving image data reaches the occurrence timing of the attention work, images of the moving image data are played back together with a mark that indicates the attention work.

8. The method of claim 6, further comprising switching images of the moving image data that are being played back on the display device in accordance with a user operation for moving the slider in the direction where the progress of the playback is moved forward or the direction where the progress of the playback is moved backward.

9. The method of claim 6, wherein each step of the work is divided into a plurality of sub-steps;
wherein the method further comprises:
displaying, on the display device, a predetermined image of the moving image data corresponding to each sub-step as an index that indicates the sub-step; and
moving the slider to a start time of the sub-step corresponding to the selected index in response to the index being selected.

10. The method of claim 6, further comprising:
displaying the product such that parts of the product on which the steps of the work are to be carried out are colored;
in response to one of the colored parts being selected, reading the moving image data of the step for the selected part; and
starting playing back the moving image data on the display device.

* * * * *